(12) United States Patent
Taniguchi et al.

(10) Patent No.: US 8,233,072 B2
(45) Date of Patent: Jul. 31, 2012

(54) ELECTRONIC DEVICE, CONTROL METHOD THEREOF, AND RECORDING MEDIUM

(75) Inventors: Hironobu Taniguchi, Kawasaki (JP); Kenetsu Furuki, Kawasaki (JP); Yoko Fujii, Kawasaki (JP); Yuko Nakajima, Kawasaki (JP); Makoto Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1137 days.

(21) Appl. No.: 11/699,574

(22) Filed: Jan. 30, 2007

(65) Prior Publication Data

US 2008/0074443 A1 Mar. 27, 2008

(30) Foreign Application Priority Data

Sep. 22, 2006 (JP) .................................. 2006-257323

(51) Int. Cl.
 *H04N 5/222* (2006.01)
 *H04N 7/14* (2006.01)
 *H04N 5/225* (2006.01)
 *H04M 1/00* (2006.01)

(52) U.S. Cl. ........... 348/333.06; 348/333.02; 348/14.02; 348/373; 348/376; 455/575.3

(58) Field of Classification Search .................. 348/373, 348/376, 333.02, 333.06, 333.12, 14.02, 348/14.03, 14.07, 211.2; 379/433.13; 455/575.1, 455/575.3, 575.4; 345/659
See application file for complete search history.

(56) References Cited

U.S. PATENT DOCUMENTS

| | | | | |
|---|---|---|---|---|
| 7,158,816 B1 * | 1/2007 | Mizuta et al. | ............ | 379/433.13 |
| 7,162,030 B2 * | 1/2007 | Bell et al. | ................. | 379/433.13 |
| 7,280,857 B2 * | 10/2007 | Geernaert | ................... | 455/575.4 |
| 7,339,600 B2 * | 3/2008 | Hwang | ............................ | 345/659 |
| 7,409,059 B2 * | 8/2008 | Fujisawa | ................... | 379/433.11 |
| 7,424,631 B2 | 9/2008 | Ishidera et al. | | |
| 7,640,043 B2 * | 12/2009 | Komiyama | ................ | 455/575.3 |
| 2002/0198006 A1 * | 12/2002 | Hirayama et al. | ............ | 455/550 |
| 2003/0203747 A1 | 10/2003 | Nagamine | | |
| 2004/0030943 A1 | 2/2004 | Ishidera et al. | | |
| 2004/0203532 A1 * | 10/2004 | Mizuta | ........................ | 455/575.1 |
| 2004/0257334 A1 | 12/2004 | Yajima | | |
| 2005/0130715 A1 * | 6/2005 | Fujisawa | .................... | 455/575.1 |

FOREIGN PATENT DOCUMENTS

JP 2003-319043 A 11/2003

(Continued)

OTHER PUBLICATIONS

Japanese Office Action mailed by JPO and corresponding to Japanese Patent Application 2006-257323 on Sep. 7, 2010, with partial translation.

(Continued)

*Primary Examiner* — Nhan T Tran
(74) *Attorney, Agent, or Firm* — Fujitsu Patent Center

(57) ABSTRACT

With regard to an electronic device including a display function in a rotatable housing, operations necessary for function calling and determining processes are facilitated. An electronic device (portable terminal apparatus) including a display function in a rotatable housing includes a displaying unit that displays a first screen (e.g., vertical screen) or a second screen (e.g., horizontal screen) in accordance with rotation, and a controlling unit (CPU) that launches a function by rotating the displaying unit and switching the first screen to the second screen and that determines an selected item from the switched second screen by rotating and returning the displaying unit from the second screen to the first screen.

23 Claims, 29 Drawing Sheets

FOREIGN PATENT DOCUMENTS

| | | |
|---|---|---|
| JP | 2004-172691 | 6/2004 |
| JP | 2004-228767 A | 8/2004 |
| JP | 2005-190007 A | 7/2005 |
| JP | 2006-135979 | 5/2006 |
| JP | 2006-135979 A | 5/2006 |
| WO | WO-02/065263 | 8/2002 |

OTHER PUBLICATIONS

Japan Patent Office: Japanese Office Action, mailed Dec. 21, 2010, for corresponding JP Patent Application No. 2006-257323, with partial English-language translation.

* cited by examiner

ELECTRONIC DEVICE, CONTROL METHOD THEREOF, AND RECORDING MEDIUM

CROSS-REFERENCE TO RELATED APPLICATIONS

This application is based upon and claims the benefit of priority from the prior Japanese Patent Application No. 2006-257323, filed on Sep. 22, 2006, the entire contents of which are incorporated herein by reference.

BACKGROUND OF THE INVENTION

1. Field of the Invention

The present invention relates generally to an electronic device such as a portable terminal apparatus including a display function in a rotatable and/or openable/closable housing, and, more particularly, to an electronic device that can switch screens, functions, etc., by rotating a displaying unit, a control method thereof, a control program thereof, and a recording medium.

2. Description of the Related Art

In some conventionally known portable terminal apparatuses, housings include folding and rotating functions, and a displaying unit and an input operation unit are included in different housings. In such a portable terminal apparatus disclosed in Japanese Patent Application Laid-Open Publication No. 2004-228767, a first housing including a displaying unit is rotatable relative to a second housing overlapping the first housing in a closed state; if the first housing is rotated clockwise relative to the second housing, a first screen is displayed on the displaying unit; and if the first housing is rotated counterclockwise relative to the second housing, a second screen is displayed on the displaying unit (abstract, FIG. 7, etc.).

By the way, when the displaying unit is configured to be rotated and switched to different screens, a plurality of screens can be used to display a multiplicity of contents. Although the first screen and the second screen are displayed by right and left rotation, respectively, and different contents are displayed on the first screen and the second screen to display a wide variety of contents on a plurality of screens in Japanese Patent Application Laid-Open Publication No. 2004-228767, applications are merely assigned by operating the housing when each screen displays a menu screen or an address book screen. For example, when creating an e-mail, an e-mail creating screen is activated; an e-mail creating process is performed on the single screen; and the e-mail creating screen can merely be changed to other functions by operating the housing. A complicated process operation is needed for the application and the screen operation. To utilize such functions, a user must be familiar with the relationship between the function and operation and must learn the operation.

Japanese Patent Application Laid-Open Publication No. 2004-228767 does not disclose or indicate such problems and does not disclose or indicate a configuration, etc for solving the problems.

SUMMARY OF THE INVENTION

An object of the present invention relates to an electronic device including a display function in a rotatable housing and is to facilitate operations necessary for function calling and determining processes.

Another object of the present invention relates to an electronic device including a display function in a rotatable housing and is to improve functionality and operationality.

To achieve the above objects, the present invention relates to an electronic device such as a portable terminal apparatus including a display function in a rotatable housing and includes a displaying unit that displays a first screen or a second screen depending on rotation and a controlling unit that controls the displaying unit. The controlling unit launches a function by switching from the first screen to the second screen due to the rotation of the displaying unit and determines an item selected from the second screen by returning from the second screen to the first screen due to the rotation of the displaying unit. Therefore, the screen can be switched and the item selected on the screen can be determined by the rotation operation of the screen, the operation can be facilitated. The function can be called by the rotation operation of the displaying unit, functionality and operationality can be improved. Therefore, the objects are achieved.

In order to achieve the above objects, according to a first aspect of the present invention there is provided an electronic device having a display function in a rotatable housing, comprising a displaying unit that displays a first screen or a second screen in accordance with rotation; and a controlling unit that launches a function by rotating the displaying unit and switching the first screen to the second screen, the controlling unit determining a selected item from the switched second screen by rotating and returning the displaying unit from the second screen to the first screen.

Preferably, the controlling unit displays character strings on the first screen and/or the second screen of the displaying unit, displays selectable pictograms or decoration pictures on the second screen by rotating the displaying unit, and determines the selected pictogram and/or the selected decoration picture from the second screen by rotating and returning the displaying unit to the first screen. Preferably, if the first screen is a vertically elongated vertical screen, the second screen is a horizontally elongated horizontal screen and, if the second screen is the vertical screen, the first screen is the horizontal screen. Preferably, the displaying unit is disposed on a movable housing and this movable housing is rotatably supported by a movable arm that is attached to a fixed housing with a hinge in an openable/closable manner. Preferably, the rotation is one or both of right rotation and left rotation. Preferably, the electronic device comprises a rotation sensor that detects the presence of the rotation of the displaying unit and a rotation direction thereof.

In order to achieve the above objects, according to a second aspect of the present invention there is provided a control method of an electronic device having a display function in a rotatable housing, the method comprising the steps of displaying a first screen or a second screen on a displaying unit; launching a function by rotating the displaying unit and switching the first screen to the second screen; and determining a selected item from the switched second screen by rotating and returning the displaying unit from the second screen to the first screen.

Preferably, the control method of an electronic device comprises the step of displaying character strings on the first screen and/or the second screen of the displaying unit, displaying selectable pictograms or decoration pictures on the second screen by rotating the displaying unit, and determining the selected pictogram and/or the selected decoration picture from the second screen by rotating and returning the displaying unit to the first screen. Preferably, in the control method of an electronic device, if the first screen is a vertically elongated vertical screen, the second screen is a horizontally elongated horizontal screen and, if the second screen is the vertical screen, the first screen is the horizontal screen. Preferably, in the control method of an electronic device, the rotation is one or both of right rotation and left rotation.

In order to achieve the above objects, according to a third aspect of the present invention there is provided a control program of an electronic device having a display function in a rotatable housing, the program being executed by a computer and comprising the steps of displaying a first screen or a second screen on a displaying unit; launching a function by rotating the displaying unit and switching the first screen to the second screen; and determining a selected item from the switched second screen by rotating and returning the displaying unit from the second screen to the first screen.

Preferably, the control program of an electronic device comprises the step of displaying character strings on the first screen and/or the second screen of the displaying unit, displaying selectable pictograms or decoration pictures on the second screen by rotating the displaying unit, and determining the selected pictogram and/or the selected decoration picture from the second screen by rotating and returning the displaying unit to the first screen. Preferably, in the control program of an electronic device, if the first screen is a vertically elongated vertical screen, the second screen is a horizontally elongated horizontal screen and, if the second screen is the vertical screen, the first screen is the horizontal screen. Preferably, in the control program of an electronic device, the rotation is one or both of right rotation and left rotation.

In order to achieve the above objects, according to a fourth aspect of the present invention there is provided a recording medium storing a computer-readable control program of an electronic device including a display function in a rotatable housing, the program being executed by a computer, the program comprises the steps of displaying a first screen or a second screen on a displaying unit; launching a function by rotating the displaying unit and switching the first screen to the second screen; and determining a selected item from the switched second screen by rotating and returning the displaying unit from the second screen to the first screen.

Preferably, the recording medium storing a computer-readable control program of an electronic device comprises the step of displaying character strings on the first screen and/or the second screen of the displaying unit, displaying selectable pictograms or decoration pictures on the second screen by rotating the displaying unit, and determining the selected pictogram and/or the selected decoration picture from the second screen by rotating and returning the displaying unit to the first screen. Preferably, in the recording medium storing a computer-readable control program of an electronic device, if the first screen is a vertically elongated vertical screen, the second screen is a horizontally elongated horizontal screen and, if the second screen is the vertical screen, the first screen is the horizontal screen.

The features and advantages of the present invention are listed as follows.

(1) Since a function is launched when a first screen is changed to a second screen and the item selected on the second screen is determined by returning to the first screen, the function can be called and the selected item can be determined by the rotation operation of the screen to facilitate the operation.

(2) Since a function is launched when a first screen is changed to a second screen and the item selected on the second screen is determined by returning to the first screen, functionality and operationality of an electronic device can be improved.

Other objects, features, and advantages of the present invention will become more apparent by reference to the embodiments thereof and accompanying drawings.

BRIEF DESCRIPTION OF THE DRAWINGS

FIGS. 17A and 17B depict a horizontal screen.

DETAILED DESCRIPTION OF THE PREFERRED EMBODIMENTS

First Embodiment

Figure 1:
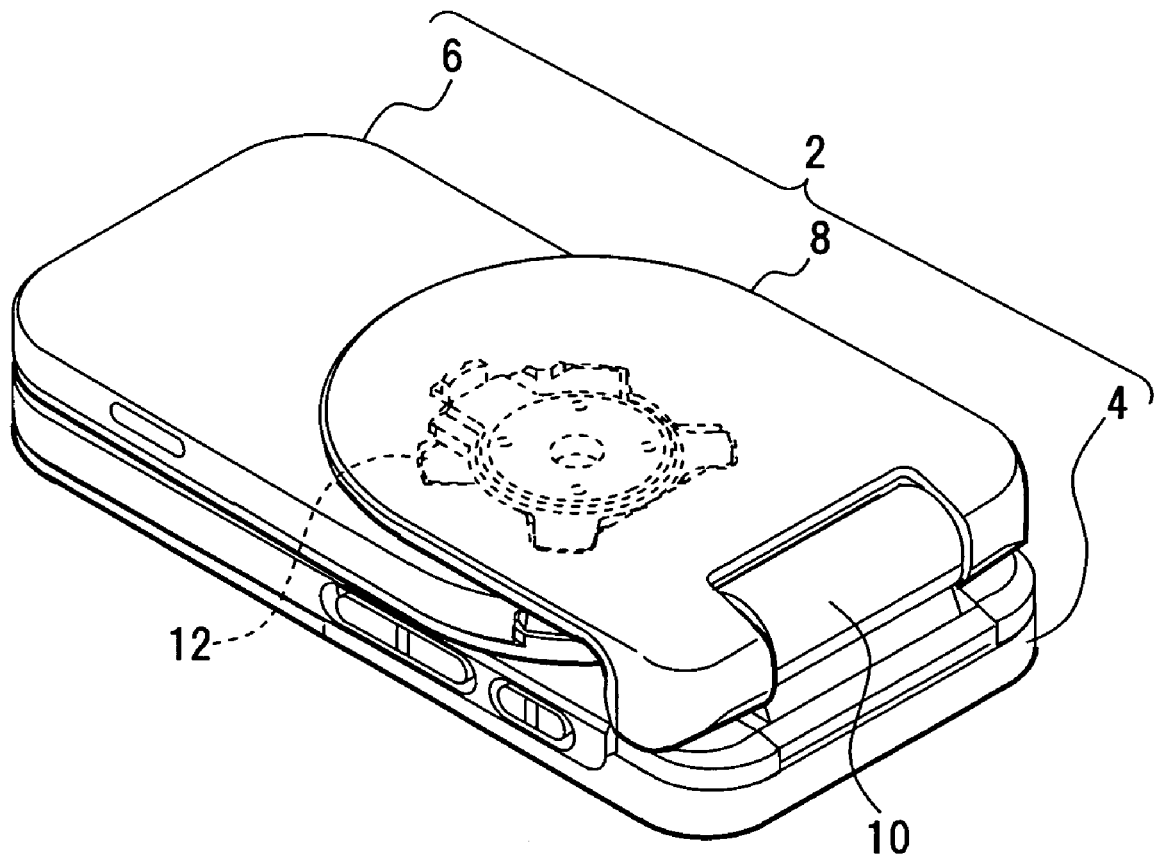
FIG. 1 is a perspective view of a portable terminal apparatus according to a first embodiment.
Figure 2:
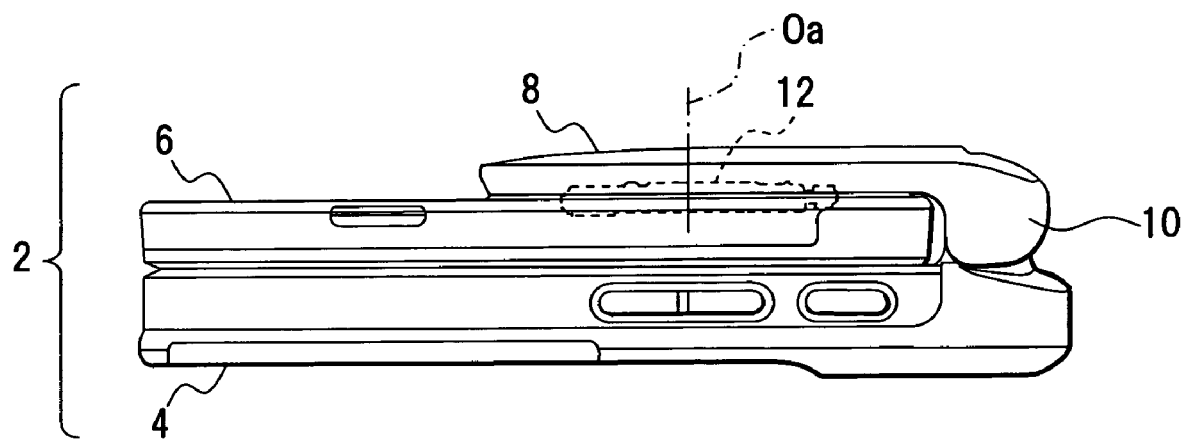
FIG. 2 is a side view of a closed state of the portable terminal apparatus.
Figure 3:
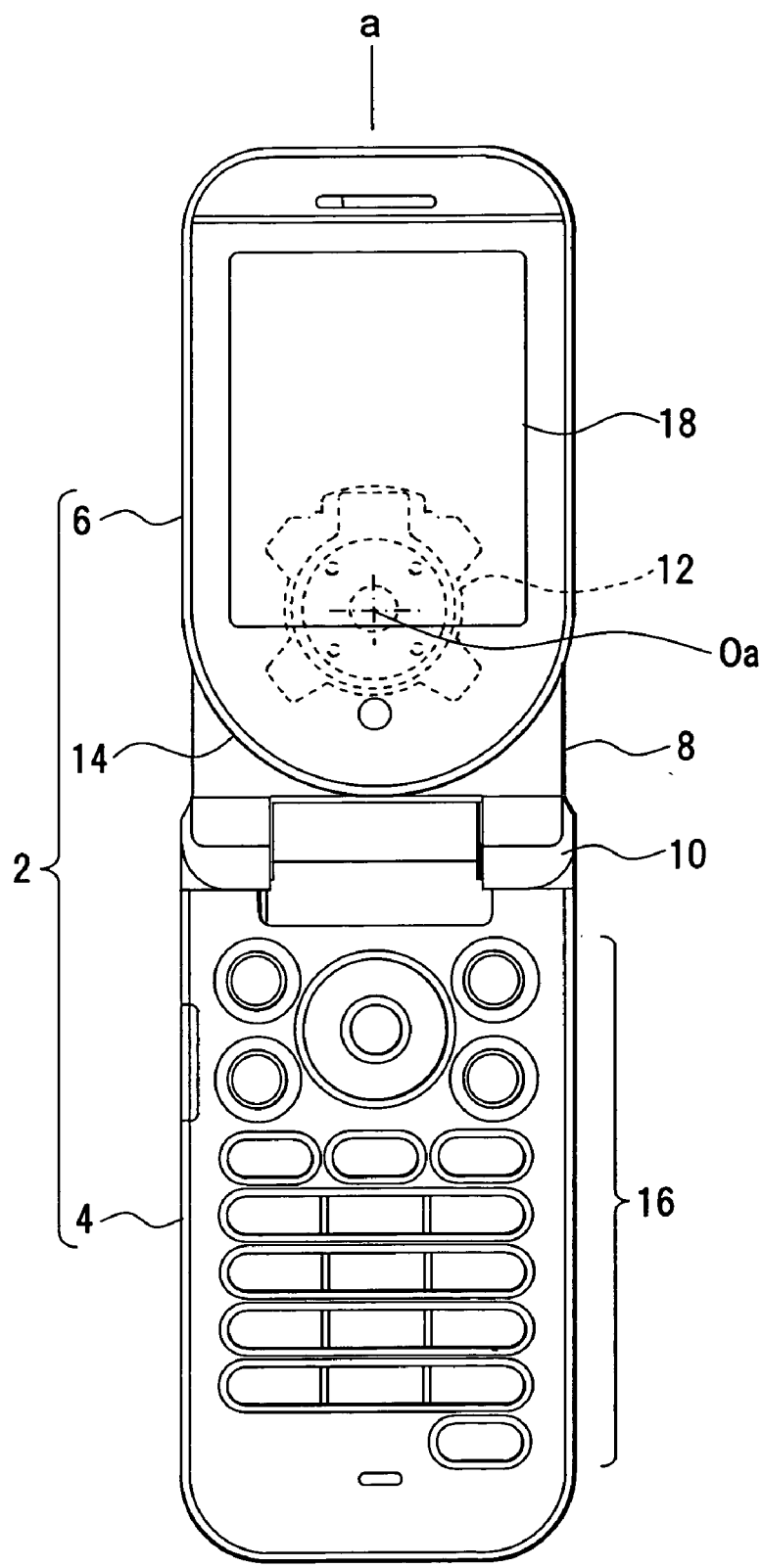
FIG. 3 is a front view of an opened state of the portable terminal apparatus.
Figure 4:
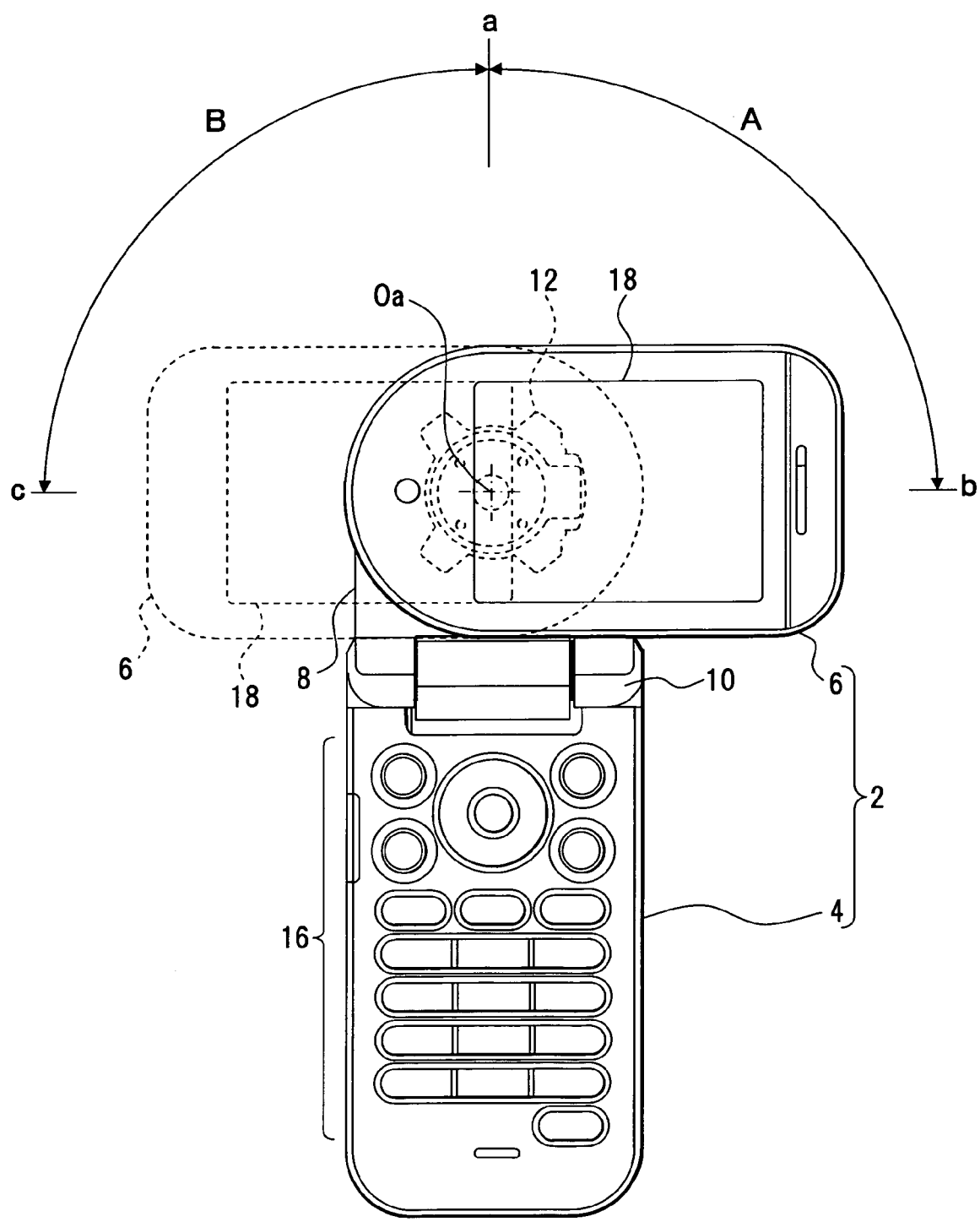
FIG. 4 depicts right rotation (left rotation) of a movable housing of the portable terminal apparatus in the opened state.

A first embodiment of the present invention will be described with reference to FIGS. 1 to 4. FIG. 1 is a perspective view of a portable terminal apparatus; FIG. 2 is a side view of a closed state of the portable terminal apparatus; FIG. 3 is a front view of an opened state of the portable terminal apparatus; and FIG. 4 depicts right rotation (left rotation) of a movable housing of the portable terminal apparatus in the opened state.

This portable terminal apparatus 2 is an example of a rotatable and/or openable/closable electronic device that includes a plurality of movable units such as an opening/closing unit and rotating units, and includes a fixed housing 4 that is an operation-side housing and a movable housing 6 that is a display-side housing, as shown in FIGS. 1 and 2. A movable arm 8 is attached to the fixed housing 4 with a hinge 10 that is an opening/closing unit; a rotation module 12 is attached to the movable arm 8 and acts as a rotation supporting unit; and the movable housing 6 is fixed to the rotation module 12. In this case, the movable housing 6 can be opened and closed by the rotation around the hinge 10, and the movable housing 6 can be rotated by a predetermined angle to the right or left from the center position (reference position of rotation) by the rotation around the rotation module 12.

As shown in FIG. 3, a rotation center Oa of the movable housing 6 is established in the vicinity of the hinge 10 and a peripheral edge 14 is formed as a half-circle edge on the movable housing 6. The fixed housing 4 is disposed with an input operation unit 16 including a plurality of keys such as symbol keys and cursor keys, and the movable housing 6 is disposed with a displaying unit 18 that is a displaying unit including an LCD (Liquid Crystal Display) device, etc. The displaying unit 18 is a rectangular shape that has vertical and horizontal sides with different lengths, and displays a first screen, for example, a vertically elongated vertical screen and a second screen, for example, a horizontally elongated horizontal screen depending on a rotation angle θ (between 0 to 90 degrees to the right or left) of the movable housing 6.

Since the portable terminal apparatus 2 includes the hinge 10, the movable housing 6 can be opened and closed along with the movable arm 8. That is, the movable housing 6 can be closed along with the movable arm 8 as shown in FIG. 1 or can be maintained in an opened state as shown in FIG. 3. As shown in FIG. 4, the movable housing 6 can be rotated by the rotation module 12 by a predetermined angle, for example, 90 degrees, from a center position to the right or left to form an L-shape with the fixed housing 4. In the opened state shown in FIG. 4 (when the displaying unit 18 is turned up), a is the center position (right/left rotation start point) conforming to the center line of the movable housing 6; b is a right rotated position (right rotation end point) of the movable housing 6; and c is a left rotated position (left rotation end point) of the movable housing 6.

In the opened state of the movable housing 6, if the movable housing 6 is located at the center position a, the displaying unit 18 can display a vertical screen as shown in FIG. 3; if the movable housing 6 is located at the right rotated position b, the displaying unit 18 can display a horizontal screen as shown by solid lines of FIG. 4; and if the movable housing 6 is located at the left rotated position c, the displaying unit 18 can display a horizontal screen as shown by dotted lines of FIG. 4. An arrow A represents the rotation from the center position a to the right rotated position b and the rotation (returning rotation) from the right rotated position b to the center position a, and corresponds to the screen switching operation from the vertical screen to the right horizontal screen. Similarly, an arrow B represents the rotation from the center position a to the left rotated position c and the rotation (returning rotation) from the left rotated position c to the center position a, and corresponds to the screen switching operation from the vertical screen to the left horizontal screen.

Figure 5:
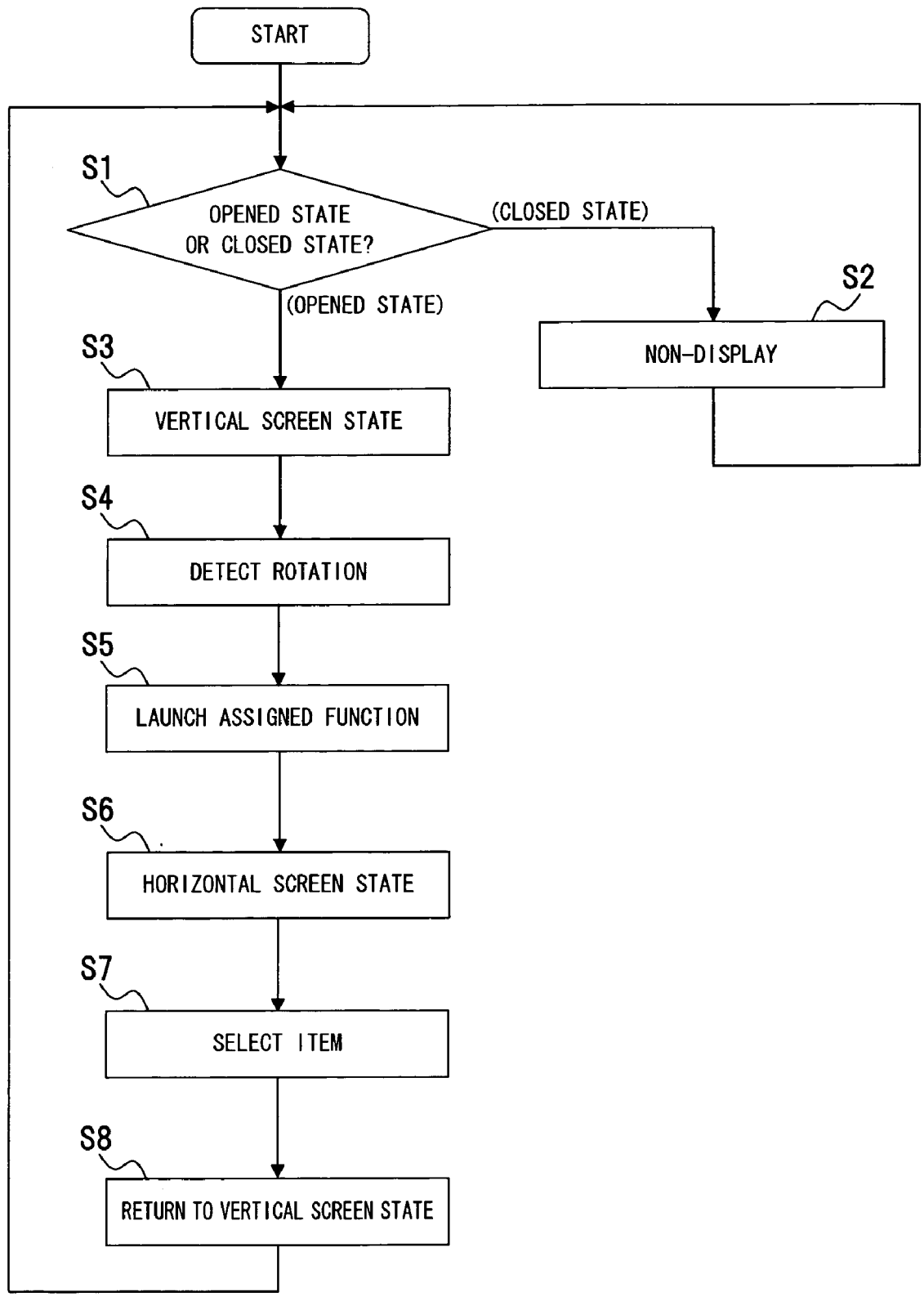
FIG. 5 is a flowchart of an example of a control method of the portable terminal apparatus.

A control method of the portable terminal apparatus 2 will be described with reference to FIGS. 1 to 4 and FIG. 5. FIG. 5 is a flowchart of process procedures that are an example of a control method of the portable terminal apparatus 2.

In this control method, it is detected whether the movable housing 6 is in the opened state or closed state (step S1) and, in the case of the closed state, the displaying unit 18 displays nothing since the fixed housing 4 overlaps the movable housing 6 to hide the displaying unit 18 (step S2).

If the movable housing 6 is in the opened state (FIG. 3) and the rotation angle of the movable housing 6 is zero degrees, the movable housing 6 is located at the center position a and the displaying unit 18 is in a vertical screen state (step S3) and displays the vertical screen as the first screen.

If the movable housing 6 is in the opened state (FIG. 3) and the movable housing 6 is rotated to the right or left, a function assigned to the rotation and the rotation direction is called based on the detection of the rotation (step S4); the function is launched (step S5); and the displaying unit 18 is shifted to the horizontal screen state (step S6) and displays the horizontal screen as the second screen. A different or the same function may be assigned to the rotation direction.

In a mail creation mode, a function associated with the mode is started to display items to be inserted into a created e-mail, for example, pictograms, decoration pictures (hereinafter, "decomail pictures"), etc., and these items can be selected on the horizontal screen (step S7). The item selected on the horizontal screen is determined by returning the movable housing 6 to the vertical screen state rotated from the right rotated position b or the left rotated position c to the center position a (step S8) and is inserted into the created e-mail. The "pictograms" as used herein refer to characters, graphics, pictures, etc., which are used for complementing texts and terms to convey emotions, intentions, etc. The "decoration pictures" as used herein refer to cartoon characters, photographs, designed pictures, paintings, etc., which are used for representing visual scenes of texts, emotions, etc. In this case, the right horizontal screen and the left horizontal screen may display different items or may display the same items. If different items are displayed, a wider variety of contents can be displayed.

Therefore, this control method includes process procedures of displaying the vertical screen or the horizontal screen, switching the screens, calling functions, determining the selected item, etc., correspondingly to the opening/closing operation of the fixed housing 4 and the movable housing 6, the rotating operation of the movable housing 6, etc.

a) Detection of Opening/Closing or Rotation of Movable Housing 6

The movable housing 6 is opened and closed with the movable arm 8 and the hinge 10 relative to the fixed housing 4. In either the opened or closed state, the movable housing 6 can be rotated on the movable arm 8. To change the display form depending on whether the movable housing 6 is in the opened state or the closed state and depending on the rotation angle, a open/close sensor 112 (FIG. 13) of a sensor unit 96 detects the opened state or the closed state and rotation sensors 42, 44 (FIGS. 6 and 13) detect the rotation angle θ of the movable housing 6.

b) Screen Display and Switching Thereof

If the movable housing 6 is in the opened state and located at the center position a, the displaying unit 18 displays the vertical screen. If the movable housing 6 is rotated to the right rotated position b, the displaying unit 18 displays the horizontal screen, or if the movable housing 6 is rotated to the left rotated position c, the displaying unit 18 is switched to the display aspect of the horizontal screen. If the movable housing 6 is returned to the center position a from the horizontal screen display position, the displaying unit 18 is switched to the display of the vertical screen. The display aspect of the screen of the display unit 18 is switched based on the open/close detection and the rotation detection by a control program described later.

c) Function Calling Control

By rotating the movable housing 6 from the center position a to the right rotated position b or the left rotated position c, a function is launched which is assigned to the rotation direction or the horizontal screen to be deployed. The function is to display selection items, etc., of application software or a database and, for example, in the e-mail creating mode, the right horizontal screen and the left horizontal screen display the decomail pictures and the pictograms, respectively, in a selectable manner. The functions are called and the contents thereof are controlled by the control program described later.

d) Item Selection and Determination Control

An item displayed on the horizontal screen can be selected on the screen. To determine the selected item, the movable housing 6 can be returned from the horizontal screen to the vertical screen to determine the item. This control is performed by the control program described later. The determined item can be pasted at a desired position on a document being created.

Figure 6:
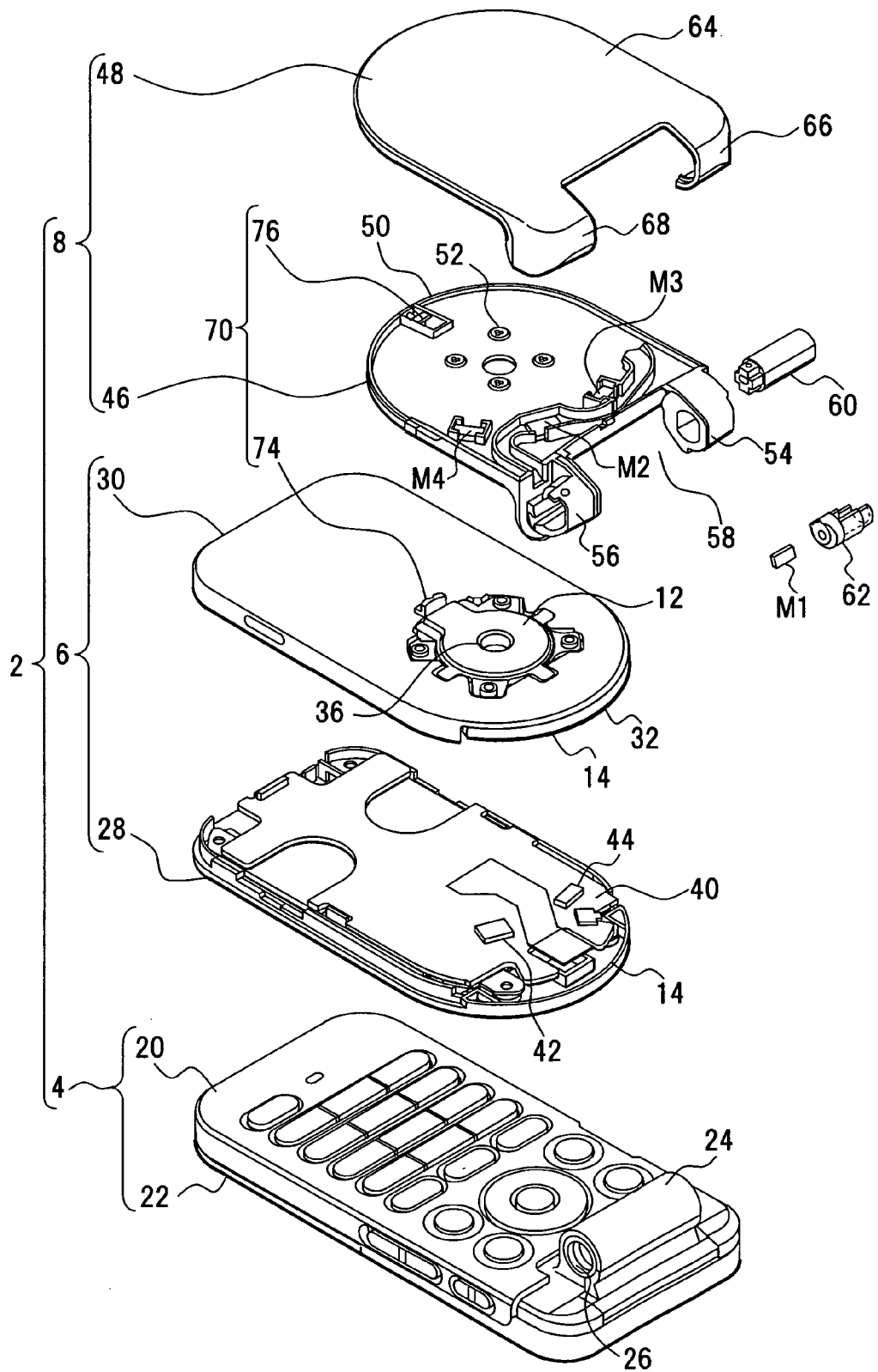
FIG. 6 is an exploded perspective view of the portable terminal apparatus.
Figure 7:
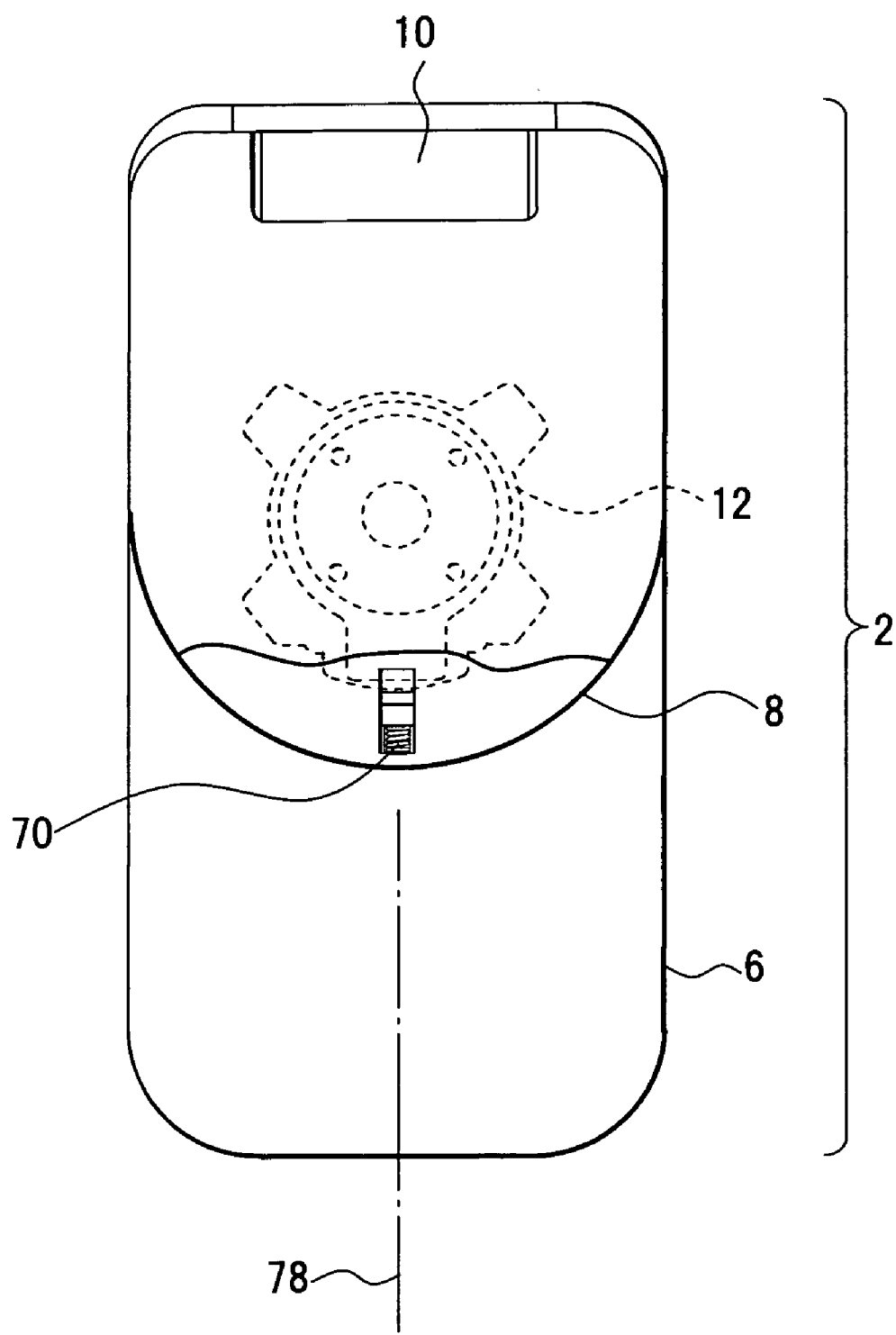
FIG. 7 depicts a position of a rotation lock mechanism of the portable terminal apparatus.
Figure 8:
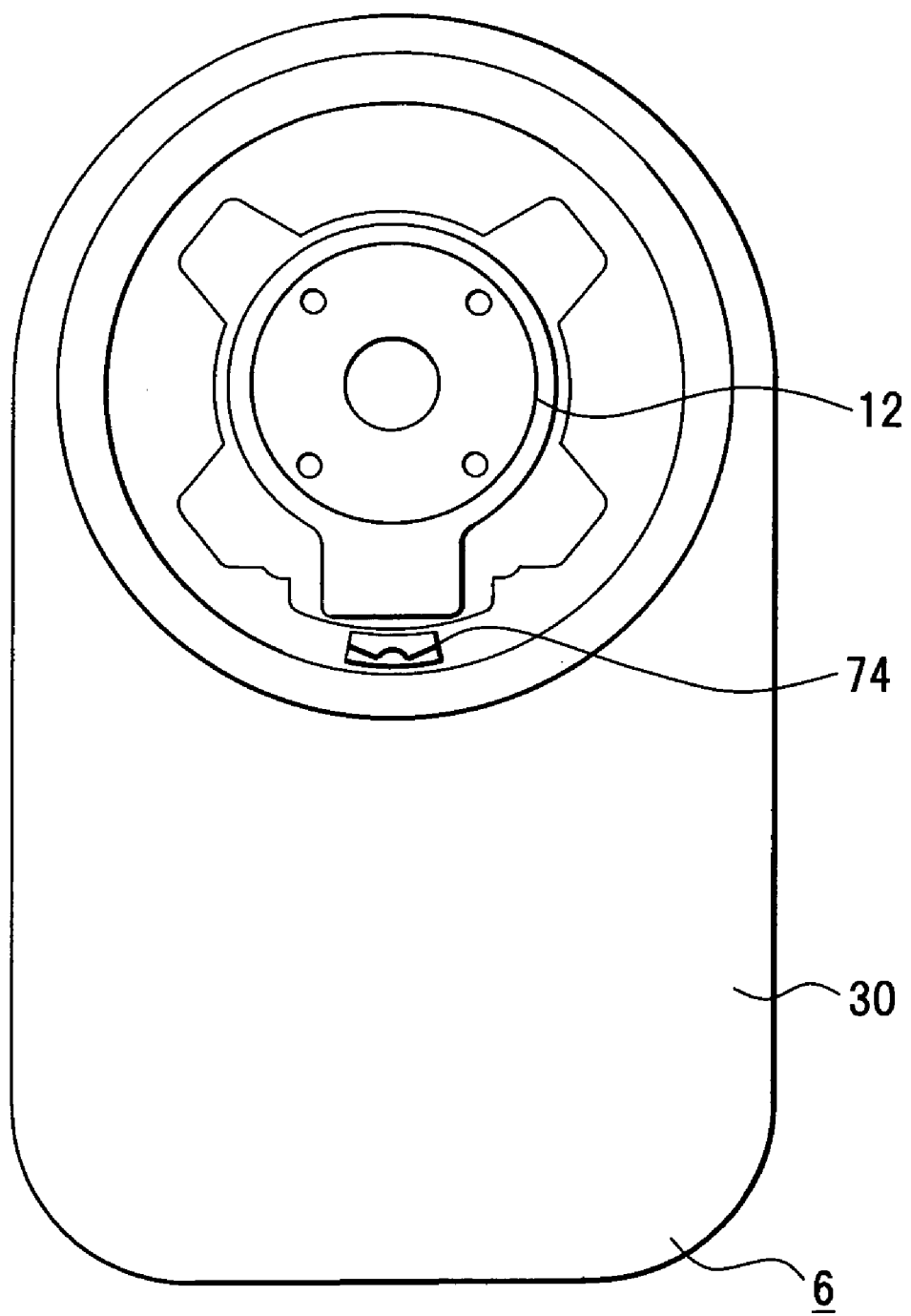
FIG. 8 depicts a top side of a movable rear-housing.
Figure 9:
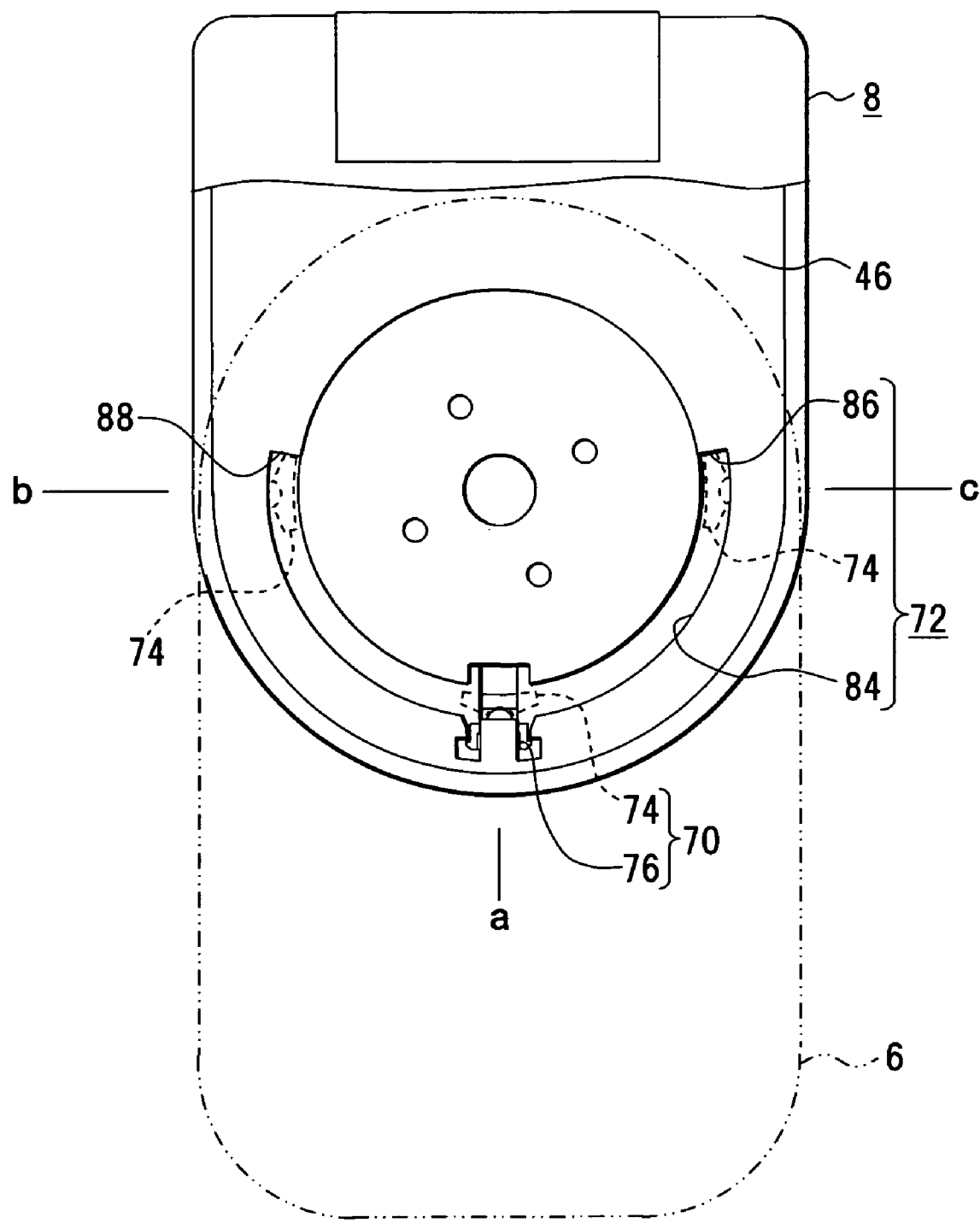
FIG. 9 depicts a rear side of a movable arm.
Figure 10:
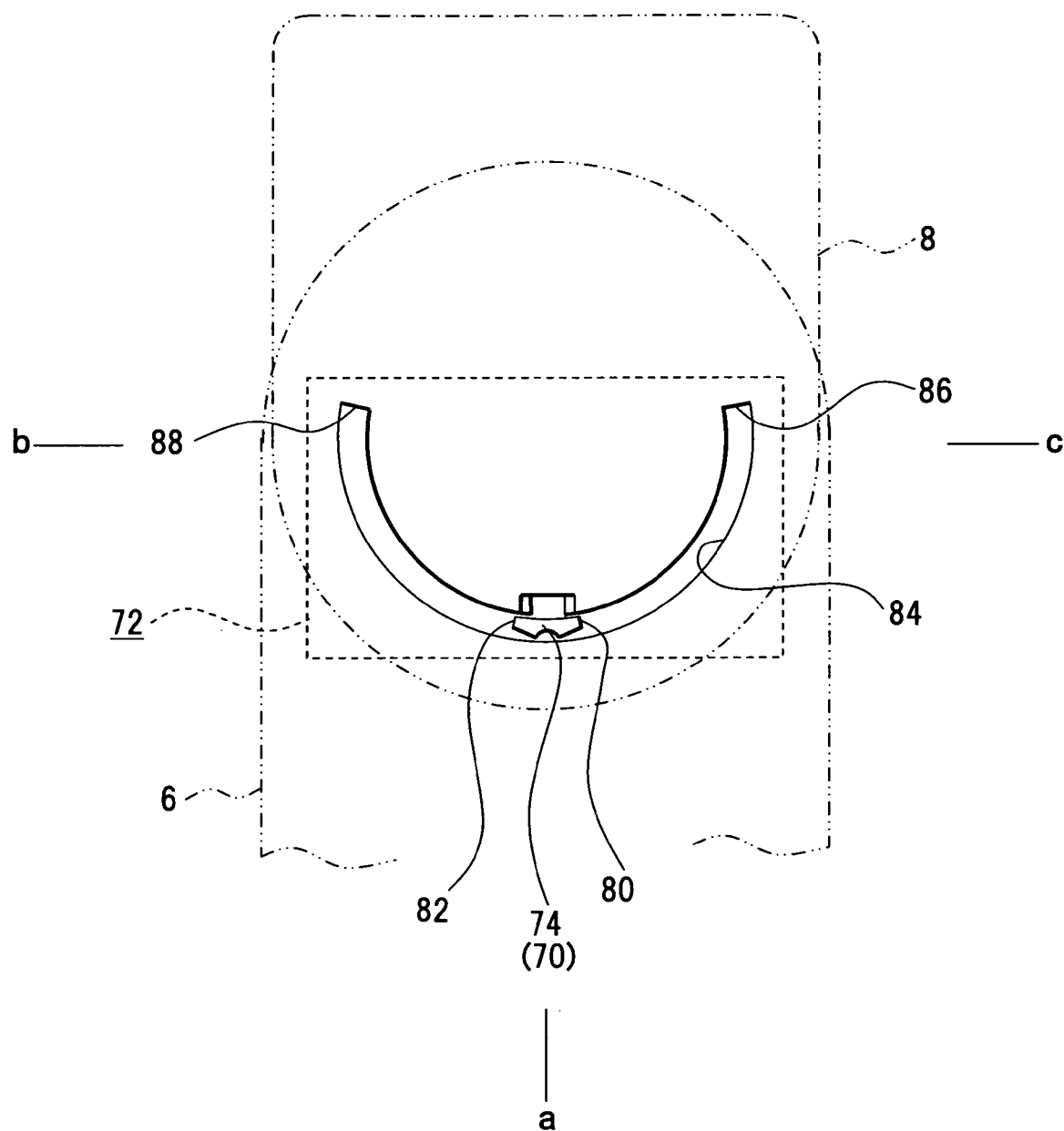
FIG. 10 depicts a center stop position and a stopper mechanism.
Figure 11:
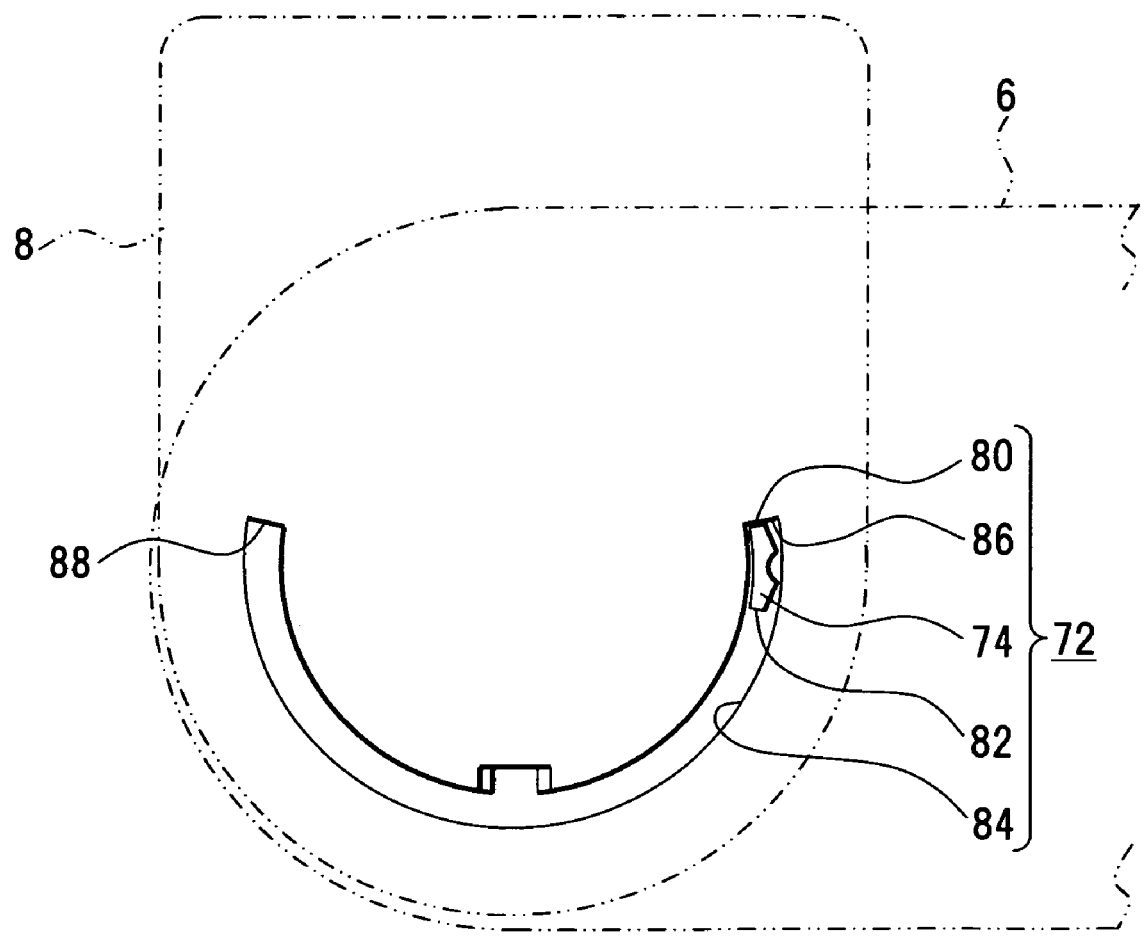
FIG. 11 depicts a stopper operation.
Figure 12:
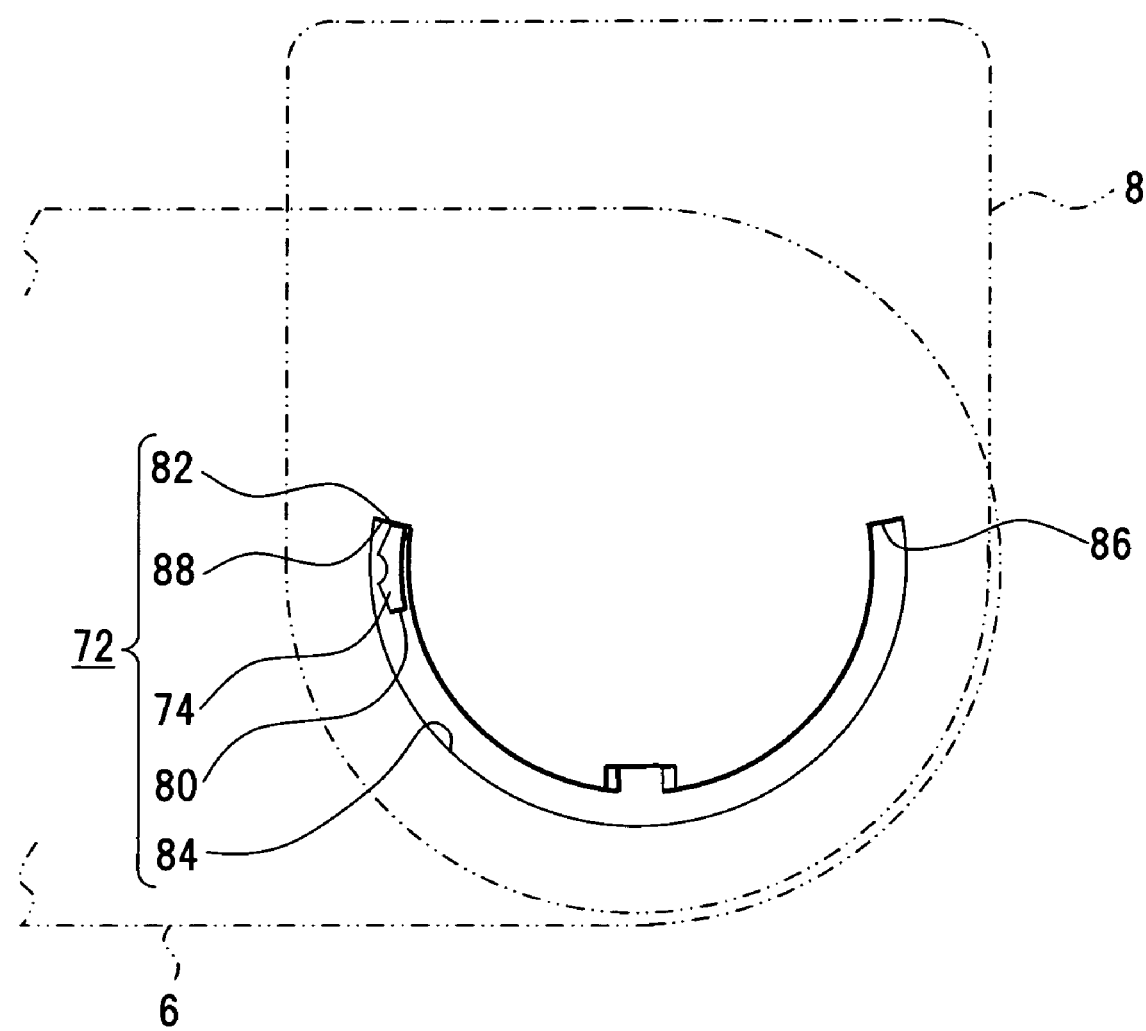
FIG. 12 depicts a stopper operation.

A configuration example of the portable terminal apparatus 2 will be described with reference to FIGS. 6 to 12. FIG. 6 is an exploded perspective view of the portable terminal apparatus 2; FIG. 7 depicts a position of a rotation lock mechanism of the portable terminal apparatus; FIG. 8 depicts a top side of a movable rear-housing; FIG. 9 depicts a rear side of a movable arm; and FIGS. 10, 11, and 12 depict a stopper configuration and operation thereof. In FIGS. 6 to 12, the same reference numerals are added to the same portions as FIGS. 1 to 4.

As shown in FIG. 6, the fixed housing 4 includes a fixed front-housing 20 and a fixed rear-housing 22, and a bearing 24 of the hinge 10 is formed on the longitudinal edge of the fixed front-housing 20. The bearing 24 is disposed with a bearing hole 26. A fixed substrate, etc., are mounted to the fixed rear-housing 22.

The movable housing 6 includes a movable front-housing 28 and a movable rear-housing 30, and the rotation module 12 is attached to a round portion 32 of the movable rear-housing 30. A through-hole 36 is formed at a rotation center portion of the rotation module 12 and the through-hole 36 is used to allow cables not shown to pass through.

The movable front-housing 28 is disposed with a movable substrate 40, and the movable substrate 40 is disposed with the rotation sensors 42, 44 that detect the rotation direction and the rotation angle θ of the movable housing 6.

The movable arm 8 includes an arm 46 and an arm cover 48. To a round portion 50 of the arm 46, the movable rear-housing 30 of the movable housing 6 is fixed with a fixing means, for example, a plurality of screws 52, along with the above rotation module 12. Bearings 54, 56 of the hinge 10 are formed on the arm 46, and the bearing 24 of the fixed housing 4 is inserted into a gap 58 between the bearings 54, 56. A hinge module 60 is a hinge axis reaching the bearing 24 of the fixed housing 4 and is inserted and fixed in the bearing 54, and a hinge module 62 also is a hinge axis and is inserted and fixed in the bearing 56. The hinge module 62 may be configured as a cable guide to allow cables not shown to pass through.

The arm 46 of the movable arm 8 is disposed with a plurality of magnets, i.e., three magnets M2, M3, M4, on the same trajectory as the rotation sensors 42, 44 disposed on the movable front-housing 28 of the movable housing 6. The center position a, the right rotated position b, or the left rotated position c of the rotating movable housing 6 is detected by the rotation sensors 42, 44 and the magnets M2, M3, M4.

The arm cover 48 includes a lid 64 that covers the top surface of the arm 46 and covering portions 66, 68 that cover the bearings 54, 56. The lid 64 is bonded to the arm 46 to protect the top surface of the arm 46, and the covering portions 66, 68 cover peripheral walls of the bearings 54, 56 to reinforce and protect the bearings 54, 56.

The hinge 10 includes the bearing 24 of the fixed housing 4, the bearings 54, 56 of the movable arm 8, and the hinge modules 60, 62 as above and supports the movable arm 8 on the fixed housing 4 in an openable/closable manner (allowing 180-degree opening/closing in this embodiment). The rotation module 12 rotatably supports the movable housing 6 on the movable arm 8.

The movable arm 8 rotatably supporting the movable housing 6 via the rotation module 12 and the movable housing 6 made rotatable on the movable arm 8 by a rotation module 12 are disposed with a rotation lock mechanism 70 (FIG. 7, etc.) that determines the center position, i.e., zero-degree position, of the allowable left/right rotation angles of 90 degrees of the movable housing 6 and a stopper mechanism 72 (FIG. 10, etc.) that determines a rotation range of the allowable left/right rotation angles of 90 degrees.

In this embodiment, as shown in FIG. 6, a pin-engaging portion 74 of the rotation lock mechanism 70 is integrally formed with the movable rear-housing 30. As shown in FIG. 8, the pin-engaging portion 74 is located outside of the rotation module 12 and projects from the top surface of the movable rear-housing 30. A lock pin 76 engaging with the pin-engaging portion 74 is attached to the arm 46 of the movable arm 8 and is disposed within the arm 46 in this embodiment.

As shown in FIG. 9, the rotation lock mechanism 70 is a mechanism for fixing and retaining the movable housing 6 rotatably supported via the rotation module 12 by the movable arm 8 at a position conforming to the fixed housing 4, i.e., at the center position a. Fixing and retaining of the movable housing 6 on the movable arm 8 generate a retaining state that allows a user to recognize the position as a reference position and to the extent that the movable housing 6 is not moved unless the user applies a force in the left or right direction with the intention to rotate the movable housing 6 and are not assumed to be a lock state that does not allow the movement thereof. The movable housing 6 is retained to the extent that the movable housing 6 is not rotated by the load of the normal rotating operation.

In this embodiment, to fix and retain the movable housing 6 at a position conforming to the fixed housing 4, i.e., at the center position a, the rotation lock mechanism 70 is disposed on a virtual center axis 78 (FIG. 7) penetrating the rotation center Oa of the rotation module 12 fixed to the movable arm 8.

As shown in FIG. 10, the stopper mechanism 72 is a configuration that sets the maximum rotation angle of the right/left rotation of the movable housing 6, centering on the rotation lock mechanism 70, to stop the movable housing 6 at the maximum rotation angle. In this embodiment, the pin-engaging portion 74 is also used as a stopper portion and the stopper surfaces 80, 82 are formed on the pin-engaging portion 74.

For this pin-engaging portion 74, an arc-shaped groove 84 is formed for inserting the pin-engaging portion 74, and stoppers 86, 88 are formed at the ends of the groove 84, coming into contact with the stopper surfaces 80, 82 of the pin-engaging portion 74. Specifically, the stopper surface 80 is applied to the stopper 86 and the stopper surface 82 is applied to the stopper 88 to block the rotation of the movable housing 6. The blocking positions are the positions b, c, which are at 90 degrees to the left/right from the center position a.

In such a configuration, when the movable housing 6 located at the position shown in FIG. 10 is rotated counterclockwise, the stopper surface 80 of the pin-engaging portion 74 is applied to the stopper 86, which is the end of the groove 84, and the movable housing 6 is stopped at the position of 90 degrees counterclockwise (on the observer's right), as shown in FIG. 11. When the movable housing 6 located at the position shown in FIG. 10 is rotated clockwise (on the observer's left), the stopper surface 82 of the pin-engaging portion 64 is applied to the stopper 88, which is the end of the groove 84, and the movable housing 6 is stopped at the position of 90 degrees to the left, as shown in FIG. 12.

Figure 13:
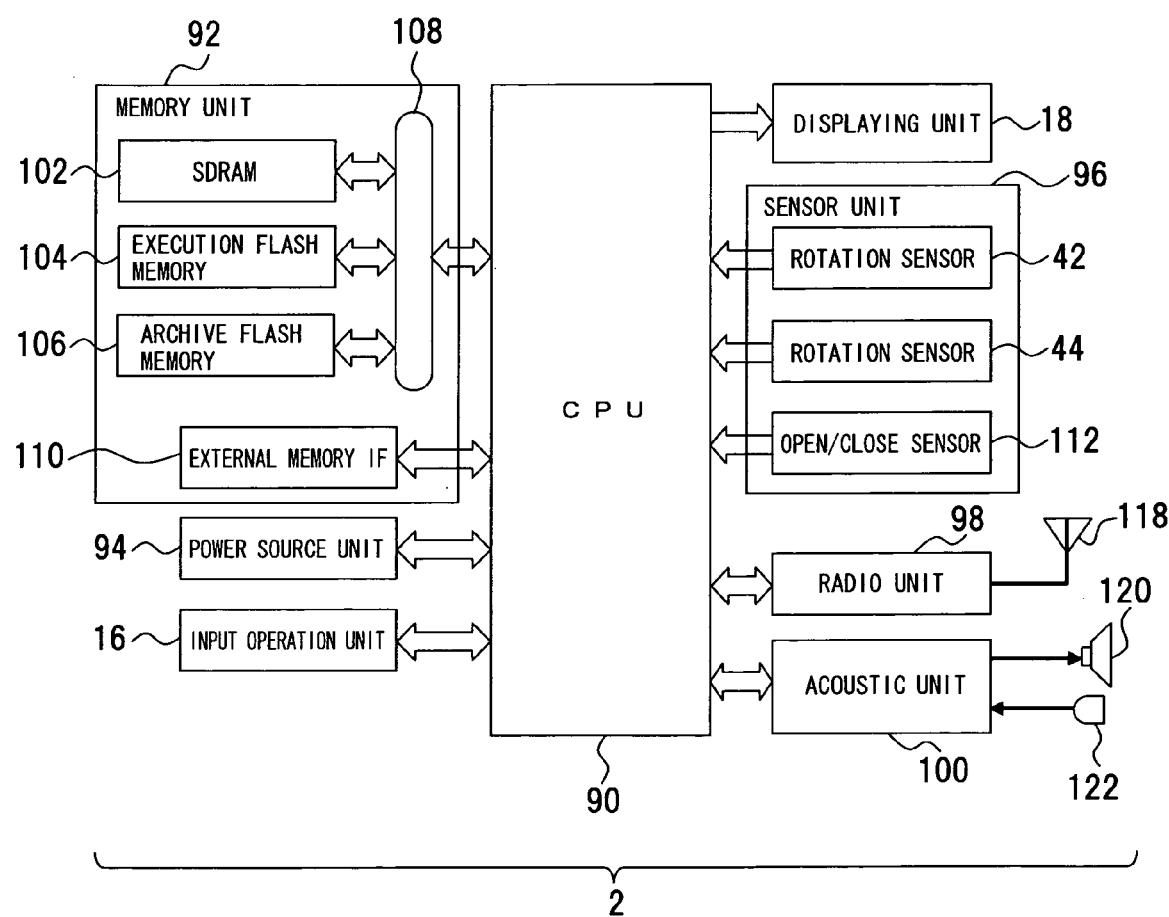
FIG. 13 depicts a circuit configuration example of the portable terminal apparatus.

A circuit configuration of the portable terminal apparatus 2 will be described with reference to FIG. 13. FIG. 13 is a block diagram of an electric circuit of the portable terminal apparatus 2. In FIG. 13, the same reference numerals are added to the same portions as FIGS. 1 to 12.

In addition to a telephone function, an e-mail transmission/reception function, etc., the portable terminal apparatus 2 includes various control functions for switching the screens, calling the functions, determining the selected item, etc., by executing the above control program depending on the opening/closing operation of the fixed housing 4 and the movable housing 6, the rotating operation of the movable housing 6, etc.

The portable terminal apparatus 2 includes the input operation unit 16, the displaying unit 18, a CPU (Central Processing Unit) 90, a memory unit 92, a power source unit 94, the sensor unit 96, a radio unit 98, and an acoustic unit 100. The input operation unit 16 includes a plurality of keys and is used to enter telephone numbers and characters for creating e-mail documents, etc. The displaying unit 18 displays the vertical screen or horizontal screen and is switched to different screen aspects and controlled to become a screen layout corresponding to the vertical screen or horizontal screen depending on the opened/closed state and the rotation angle of the movable housing 6.

The CPU 90 executes the control program, etc., in the memory unit 92 to load the detection information and the control information such as loading the input of the input operation unit 16 and the detection signal of the sensor unit 96, to read and write the information of the memory unit 92, and to perform various controls such as the screen control of the displaying unit 18. With regard to the vertical screen and the horizontal screen, the CPU 90 controls the screen layout corresponding to each screen and launches an optimum function for each screen and, in the function corresponding to the vertical screen, the CPU 90 is used for the menu list display, the data list display, the telephone history display, etc., utilizing the spread in the up/down direction of the vertically elongated vertical screen. In the function corresponding to the horizontal screen, the CPU 90 is used for the panoramic display of a camera image, the English text display, the processing thereof, the deployment of television broadcasting reception images, etc., utilizing the spread in the width direction of the horizontally elongated horizontal screen.

The memory unit 92 stores a control program including processes such as execution of functions corresponding to the screen switching, the screen layout switching, and the opening/closing or rotating (screen), other programs, and various data and is a recording medium including an SDRAM (Synchronous Dynamic Random-Access Memory) 102, an execution flash memory 104, and an archive flash memory 106 in this embodiment. The SDRAM 102, the execution flash memory 104, and the archive flash memory 106 are connected to the CPU 90 through a bus 108.

The SDRAM 102 configures a work area, executes the program read and loaded from the archive flash memory 106, and generates calculation processes and control information. The execution flash memory 104 stores various data and constructs a database, etc. The archive flash memory 106 stores various programs such as the OS. (Operating System) and control program.

An external memory IF (interface) 110 is connected to an external memory, such as a memory card, and the external memory stores the address data, such as telephone numbers and e-mail addresses, and various contents.

The power source unit 94 includes a battery, a battery charging circuit controlled by the CPU 90, a stabilizing circuit, a power source controlling circuit, etc., and supplies power to various function units such as the radio unit 98.

The sensor unit 96 detects the opening/closing of the movable housing 6 due to the movable arm 8, the rotation angle θ (between 0 to 90 degrees to the right or left) and the rotation direction of the movable housing 6. Therefore, the sensor unit 96 includes the open/close sensor 112 and the rotation sensors 42, 44. The open/close sensor 112 detects presence of magnetic flux from the magnets M (FIG. 6) to generate detection output that represents whether the movable housing 6 is in the opened state or closed state. The rotation sensors 42, 44 are disposed on a movable plate 40 of the movable housing 6, and the disposed positions of the three magnets M2, M3, M4 (FIG. 6) conform to positions on the trajectory of the rotation sensors 42, 44 of the rotating movable housing 6.

For example, when located at the center position a (FIG. 3) of the movable housing 6, since the rotation sensor 42 overlaps the magnet M2 and the rotation sensor 44 overlaps the magnet M3, the output indicating the center position a of the movable housing 6 can be acquired from the rotation sensors 42, 44. At the center position a, for example, the same high-level or low-level output can be acquired from the rotation sensors 42, 44. If the movable housing 6 is rotated to the right or left, the magnetic forces from the magnets M2, M3, M4 affecting the rotation sensors 42, 44 are changed, and the rotation sensors 42, 44 generate the output corresponding to the change. The change in the output is generated from the left/right rotation angle θ of 20 degrees and, therefore, represents the rotation direction to the right or left. The output indicating a position of 90 degrees to the right or position of 90 degrees to the left can be acquired from the rotation sensors 42, 44. For example, when the high-level output is acquired from the rotation sensor 42 and the low-level output is acquired from the rotation sensor 44, the output indicates the position of 90 degrees to the right, and when the output is acquired inversely, the output indicates the position of 90 degrees to the left.

The radio unit 98 performs transmission/reception for voice communication or data communication such as e-mail through an antenna 118 and performs the modulation process of voice and data, the demodulation process of voice and data from radio signals, etc.

The acoustic unit 100 outputs received voice through a speaker 120 or captures from a microphone 122 and amplifies voice to be transmitted, etc.

Figure 14A:
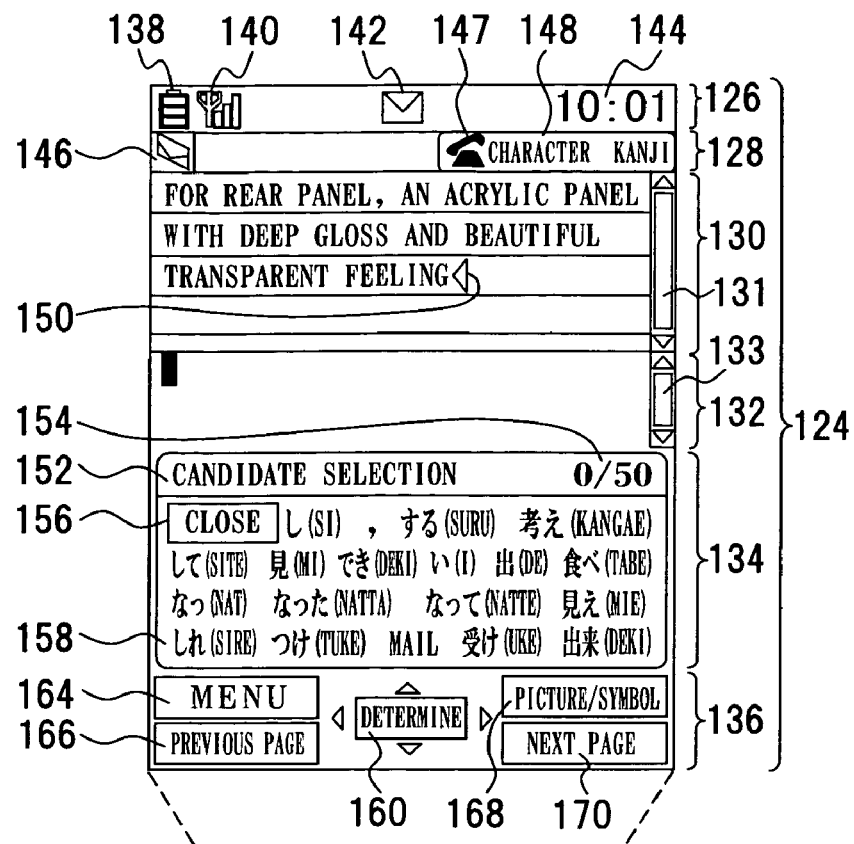
FIGS. 14A and 14B depict a vertical screen.
Figure 14B:
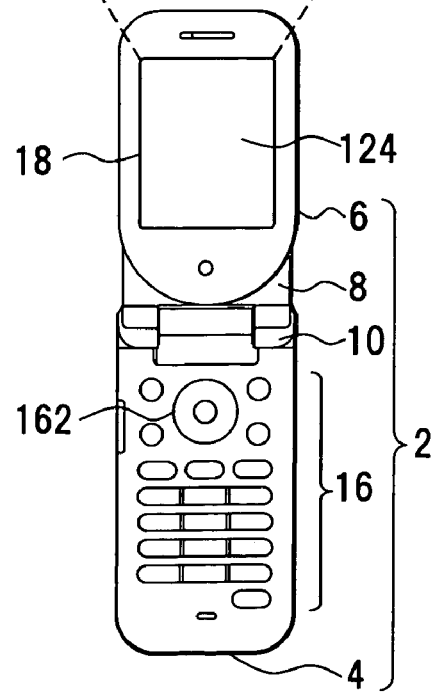
Figure 15A:
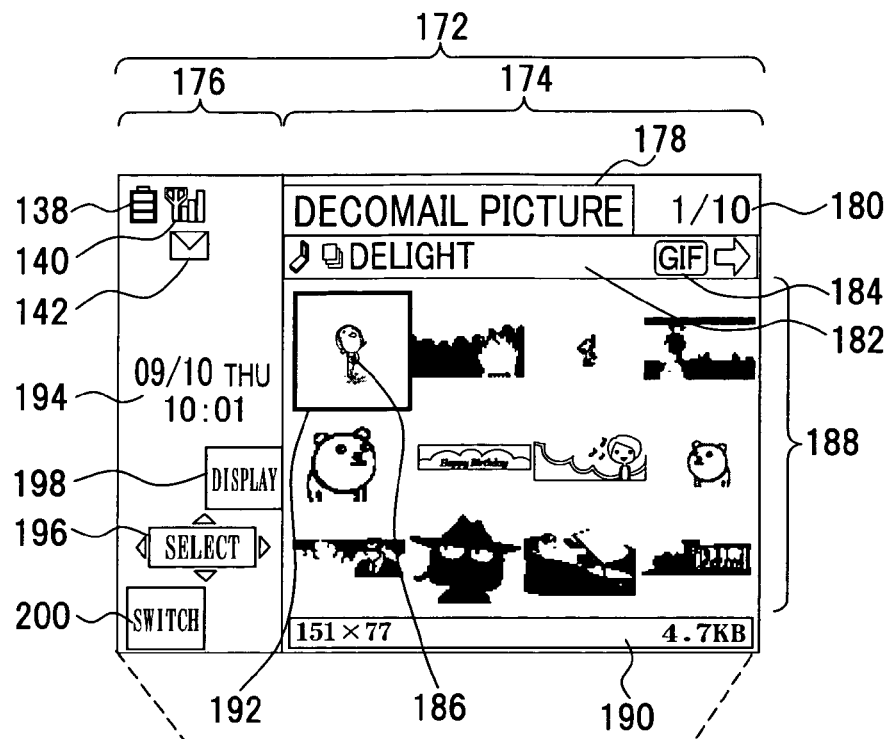
FIGS. 15A and 15B depict a horizontal screen.
Figure 15B:
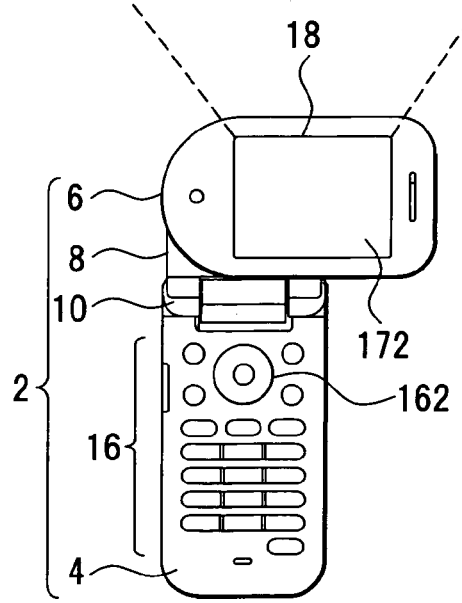
Figure 16A:
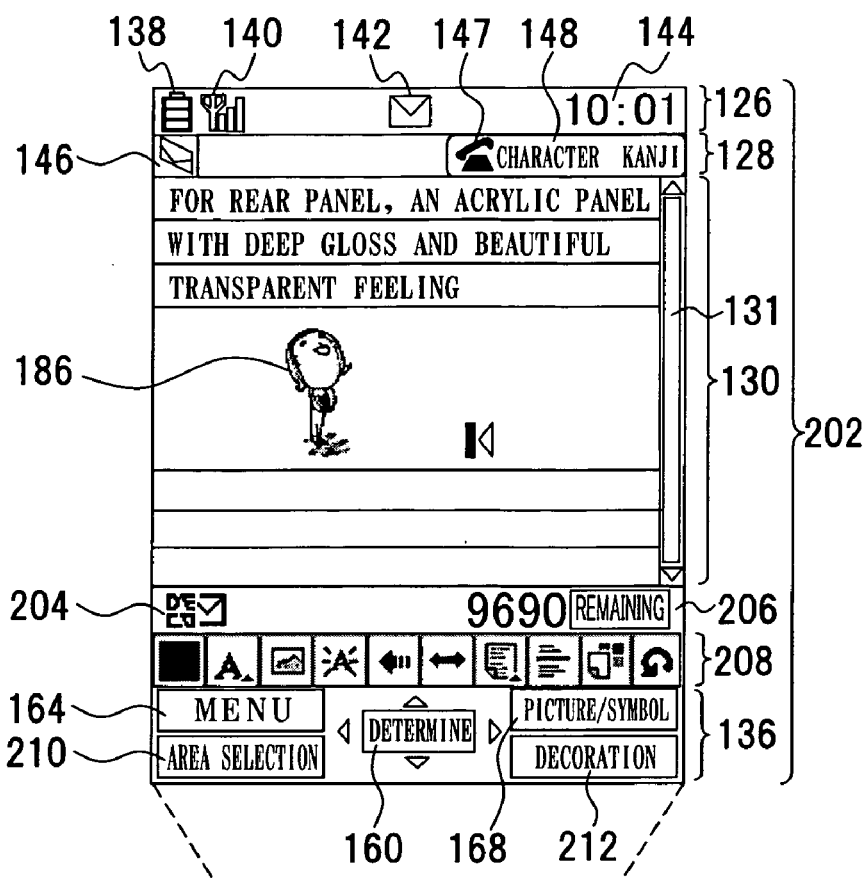
FIGS. 16A and 16B depict a vertical screen.
Figure 16B:
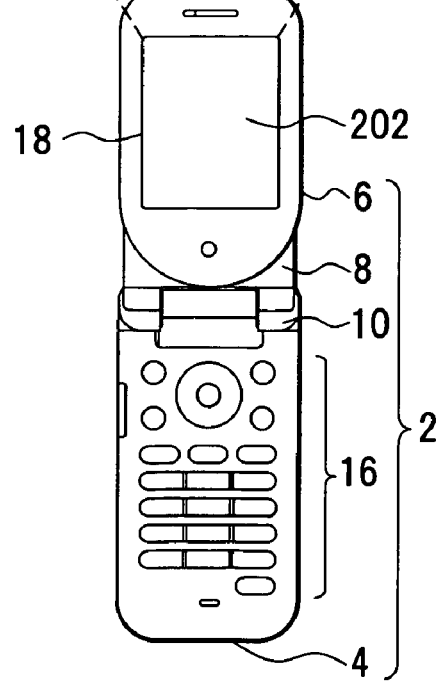
Figure 17A:
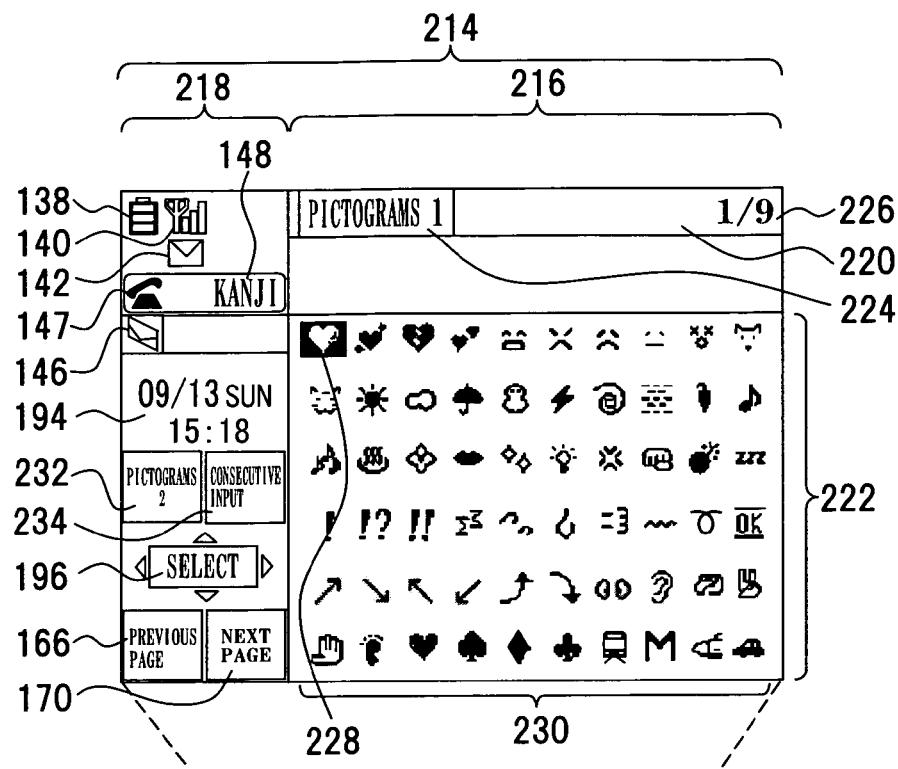
Figure 17A:
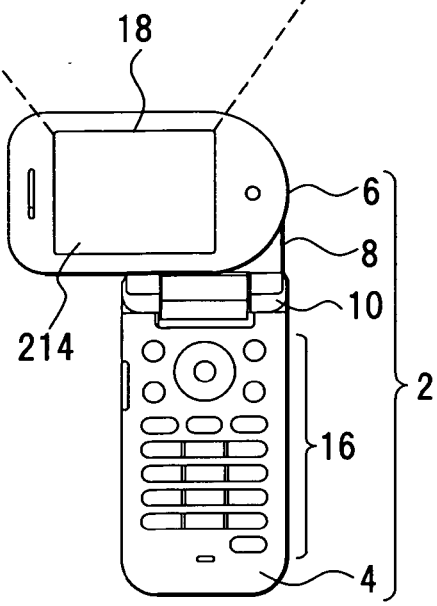
Figure 18A:
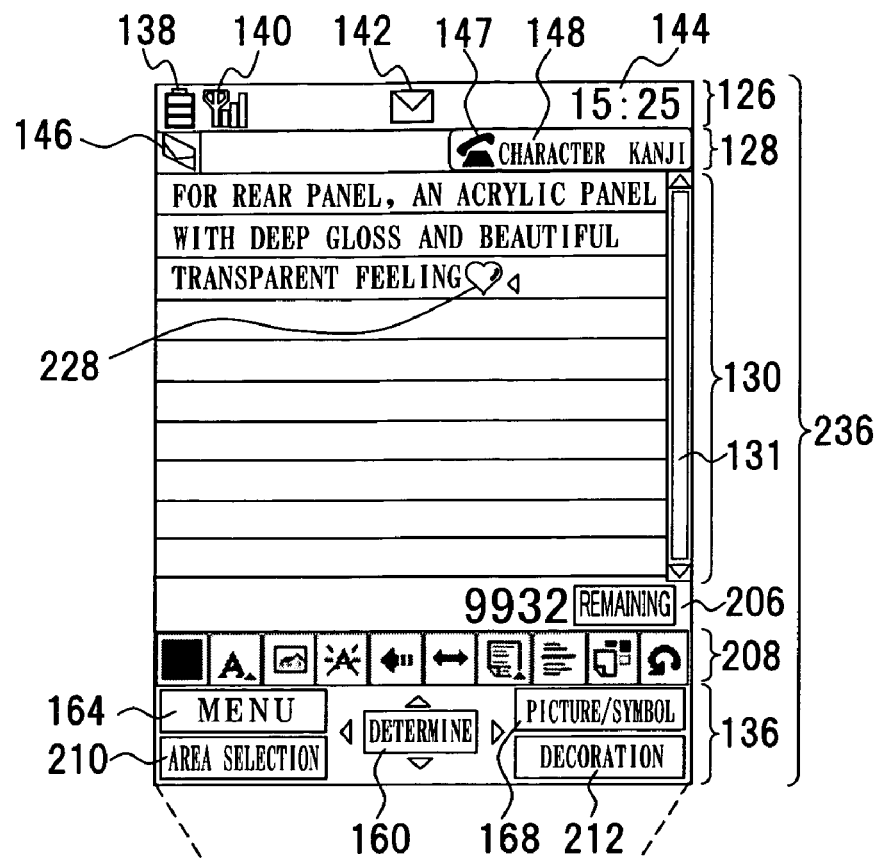
FIGS. 18A and 18B depict a vertical screen.
Figure 18B:
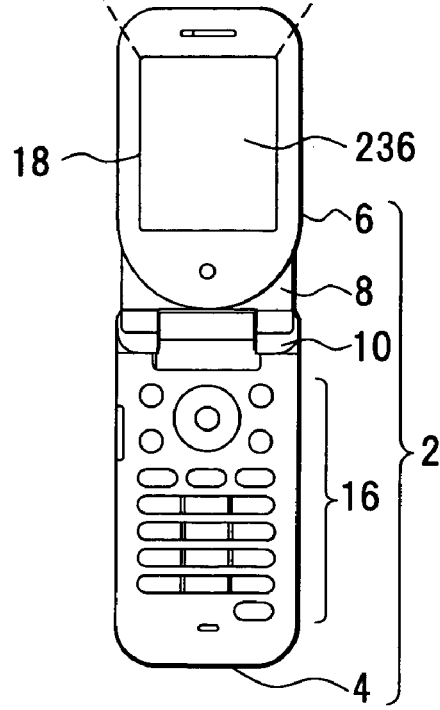
Figure 19A:
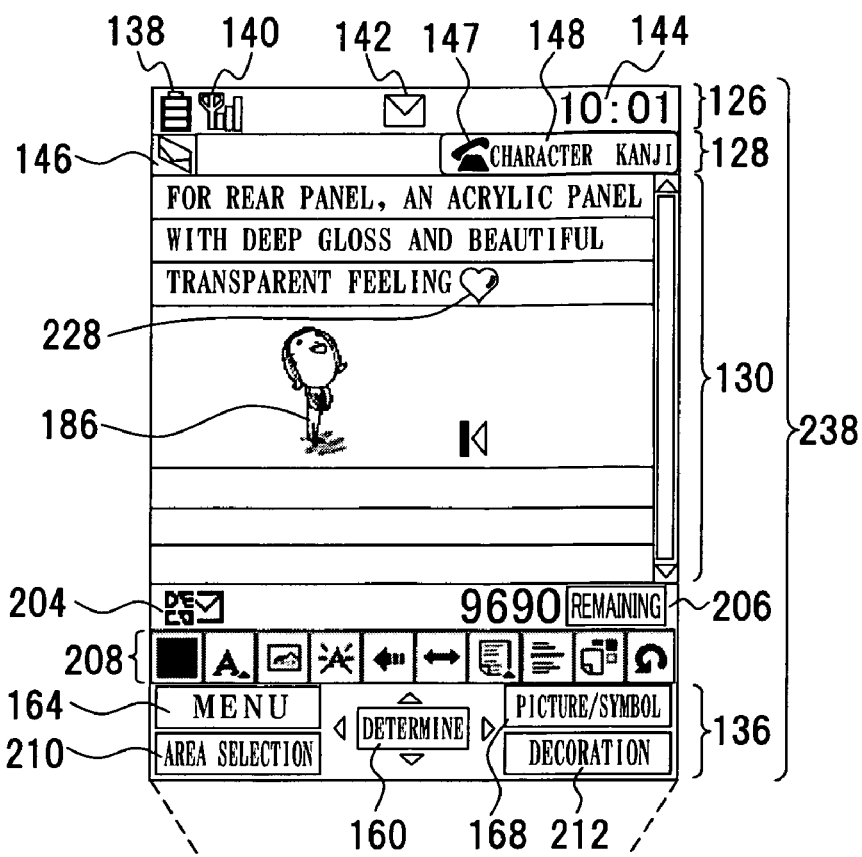
FIGS. 19A and 19B depict a vertical screen.
Figure 19B:
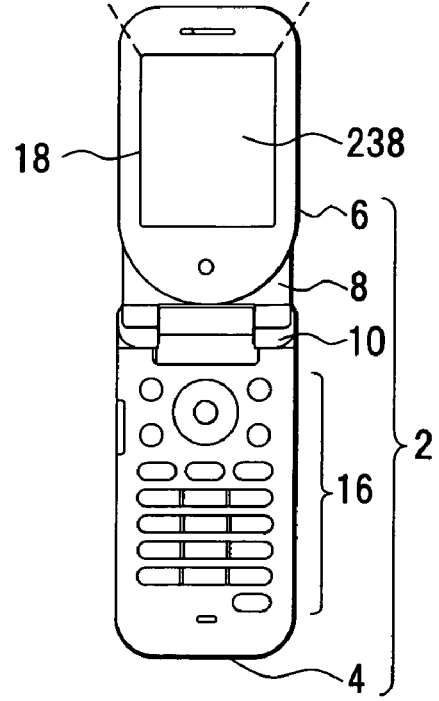

The vertical screen and the horizontal screen of the displaying unit 18 will be described with reference to FIGS. 14A to 19B. FIGS. 14A and 14B depict a vertical screen in the middle of creating an e-mail in the mail creation mode; FIGS. 15A and 15B depict a horizontal screen for decomail pictures; FIGS. 16A and 16B depict a vertical screen with a decomail picture added; FIGS. 17A and 17B depict a horizontal screen that displays an e-mail document and a pictogram group; FIGS. 18A and 18B depict a vertical screen of an e-mail document with a pictogram added; and FIGS. 19A and 19B depict a vertical screen of an e-mail document with the decomail picture and the pictogram added. In FIGS. 14A to 19B, the same reference numerals are added to the same portions as FIGS. 1 to 13.

The screen display of the displaying unit 18 has the following display aspects.

1) Vertical Screen at Center Position a of Movable Housing 6 (FIGS. 14A and 14B)

When the movable housing 6 is in the opened state, the displaying unit 18 is in a vertical screen state and a vertically elongated vertical screen 124 is displayed as the first screen. The mail creation mode is selected from a menu screen, and an e-mail body text creation screen displays a state display field 126, a display field 128 for a mode, etc., a determined document display field 130, an input display field 132, a candidate selection display field 134, and a selection field 136 for a menu, etc.

The state display field 126 displays a battery mark 138 indicating a state of a battery remaining amount, a radio-wave reception intensity mark 140 indicating radio-wave reception intensity, a mail mark 142 indicating presence of unread e-mails, and a time display 144 indicating a clock time.

The display field 128 for a mode, etc., displays a mode mark 146 indicating that a mode is the mail creation mode, a telephone mark 147, and a character mark 148 indicating characters used. The determined document display field 130 displays a scroll bar 131 and displays a determined document of the e-mail document being created. In this case, an end mark 150 is displayed along with "For rear panel, an acrylic panel with deep gloss and beautiful transparent feeling". The input display field 132 displays a scroll bar 133, is used to enter the input characters, etc., and is in a blank state since no input characters are currently exist.

The candidate selection display field 134 displays a mark 152 indicating that a field is the candidate selection field, a page display 154 indicating a current page, an icon 156 for closing the candidate selection display field 134, and a plurality of selection candidates 158.

The selection field 136 for a menu, etc. displays a determination button 160 at the center, a menu button 164 selected by a cursor key 162, a previous page button 166 for going to a previous page, a selection button 168 for selecting a picture or symbol, and a next page button 170 for displaying a next page.

2) Horizontal Screen when Rotated from Center Position a to Right Rotated Position b (FIGS. 15A and 15B)

By rotating the movable housing 6 from the center position a to the right, a horizontally elongated horizontal screen 172 is displayed as the second screen. The horizontal screen 172 includes a main display field 174 and a sub-display field 176; the main display field 174 includes a title field 178 indicating displayed contents; and this title field 178 indicates that the displayed contents are the "decomail pictures". A page 180 is displayed adjacent to the title field 178. A title bar 182 for displaying titles of the decomail pictures is disposed under the title field 178, and this title bar 182 displays a GIF mark 184 indicating the GIF (Graphics Interchange Format), etc. Under the title bar 182, a decomail picture group 188 including a plurality of different decomail pictures 186 is displayed as items to be selected, and a size bar 190 indicating a size of the decomail pictures 186 is displayed under the decomail picture group 188. In this case, 157×77 and 4.7 KB indicate a size of the selected decomail picture 186. In this case, a frame 192 surrounding the decomail picture 186 indicates the decomail picture 186 that is a selected item.

The sub-display field 176 displays the battery mark 138, the radio-wave reception intensity mark 140, the mail mark 142, a date and time display 194, and a selection button 196 at the center between a display button 198 for selecting a display on the upper side and a switch button 200 for selecting the display switching under the selection button 196, and the selection button 196, the display button 198, and the switch button 200 are selected and operated by the cursor key 162.

3) Vertical Screen when Returned from Right Rotated Position b to Center Position a (FIGS. 16A and 16B)

When the movable housing 6 is rotated and returned from the horizontal screen 172 to the center position a, a vertically elongated vertical screen 202 is displayed. The vertical screen 202 is different from the vertical screen 124 (FIG. 14A) in that the determined document display field 130 is enlarged. The decomail picture 186 selected on the previous screen is determined on the vertical screen 202 by rotating the removable housing 6, i.e., by the rotation of the displaying unit 18. The decomail picture 186 configures a portion of the document of the determined document display field 130. In this case, a section under the determined document display field 130 displays a decomail mark 204 indicating that the decomail picture 186 is added to the e-mail, a remaining amount display 206 for an allowable amount of the determined document display field 130, and a plurality of process marks 208 indicating characters and operations such as editing.

In this case, a range selection button 210 for selecting a range is displayed under the menu button 164 of the selection field 136 for a menu, etc., and a decoration button 212 for selecting a decoration is displayed under the selection button 168. The same reference numerals are added to the portions in common with the vertical screen 124 and the description thereof is omitted.

4) Horizontal Screen when Rotated from Center Position a to Left Rotated Position c (FIGS. 17A and 17B)

By rotating the movable housing 6 from the center position a to the left, a horizontally elongated horizontal screen 214 is displayed. A main display field 216 and a sub-display field 218 are established on the horizontal screen 214; a title field 220 and a pictogram selection displaying field 222 are established on the main display field 216; the title field 220 displays a title 224 indicating "pictograms 1", and a page 226; and the pictogram selection displaying field 222 displays a pictogram group 230 consisting of a plurality of pictograms 228.

The sub-display field 218 displays the battery mark 138, the radio-wave reception intensity mark 140, the mail mark 142, a date and time display 194 as is the case with the horizontal screen 172 (FIG. 15A), and displays the mode mark 146, the telephone mark 147, and the character mark 148, along with the selection button 196 at the center of the section under the date and time display 194, a title button 232 indicating "pictograms 2" and a consecutive input button 234 on the upper side, and the previous page button 166 and the next page button 170 under the selection button 196, unlike the horizontal screen 172 (FIG. 15A).

5) Vertical Screen when Returned from Left Rotated Position c to Center Position a (FIGS. 18A and 18B)

When the movable housing 6 is rotated and returned from the horizontal screen 214 to the center position a, a vertically elongated vertical screen 236 is displayed. Unlike the vertical screen 202 (FIG. 16A), this vertical screen 236 displays the pictogram 228 selected on the previous screen with the document on the determined document display field 130. The pictogram 228 is determined on the vertical screen 236 by rotating the removable housing 6, i.e., by the rotation of the displaying unit 18. The pictogram 228 configures a portion of the document of the determined document display field 130.

The upper and lower sides of the determined document display field 130 are the same display as the vertical screen 124 (FIG. 14A) or the vertical screen 202 (FIG. 16A).

6) Vertical Screen of E-mail Document with Decomail Picture and Pictogram Added (FIGS. 19A and 19B)

Although the vertical screen 202 (FIG. 16) is a decomail picture inserted screen and the vertical screen 236 (FIG. 18) is a pictogram inserted screen, on a vertical screen 238 in this case, a document can be created with both the pictogram 228 and the decomail picture 186 inserted as shown in FIG. 19. Since the decomail picture 186 is inserted in this case, a screen form is the same as the vertical screen 202 shown in FIG. 16. Therefore, the same reference numerals are added to the same portions as FIG. 16 and the description thereof is omitted.

Figure 20:
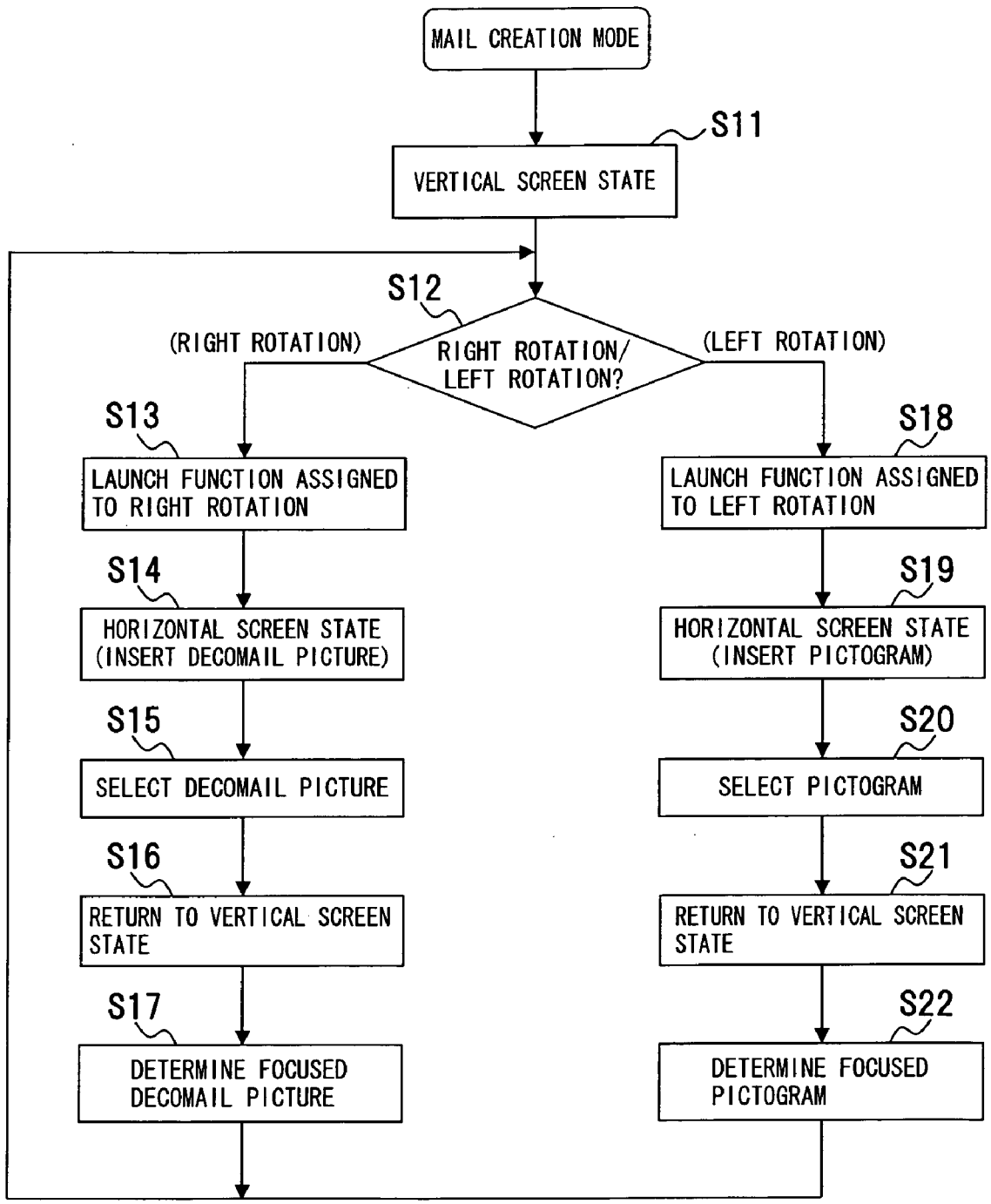
FIG. 20 is a flowchart of process procedures of a control program.

The screen operation of the displaying unit 18 will be described with reference to FIG. 20. FIG. 20 depicts an example of process procedures of the control program of the displaying unit 18.

When the movable housing 6 is opened from the closed state shown in FIGS. 1 and 2, the movable housing 6 becomes the opened state relative to the fixed housing 4, as shown in FIG. 3. The displaying unit 18 in the opened state is in the vertical screen state (step S11); the mail creation mode is selected from the menu screen; and the e-mail body text creation screen displays, for example, the vertical screen 124 (FIG. 14A).

The rotation of the movable housing 6 is monitored; the detection information is loaded from the rotation sensors 42, 44 to the CPU 90; and it is determined from the detection information whether the displaying unit 18 is rotated to the right or left (step S12). As shown by the solid lines in FIG. 4, if the movable housing 6 is rotated to the right, a function assigned to the right rotation is called and this function is launched (step S13). In this case, the displaying unit 18 is in the horizontal screen state (step S14) and displays the horizontal screen 172 (FIG. 15A), for example. Since the horizontal screen 172 is the decomail picture insert mode, the displayed decomail picture 186 is selected (step S15, FIG. 15A). When the movable housing 6 is returned to the center position a after selecting the decomail picture, the displaying unit 18 is returned to the vertical screen state (step S16); the focused decomail picture 186 is determined (step S17); and the decomail picture 186 becomes a portion of the determined document (FIG. 16A).

As shown by the dotted lines in FIG. 4, if the movable housing 6 is rotated to the left, a function assigned to the left rotation is called and this function is launched (step S18). That is, a function is launched which is different from the function of the right rotation. In this case, the displaying unit 18 is in the horizontal screen state (step S19) and displays the horizontal screen 214 (FIG. 17A), for example. Since the horizontal screen 214 is the pictogram input mode, the displayed pictogram 228 is selected (step S20, FIG. 17A). When the movable housing 6 is returned to the center position a after selecting the pictogram, the displaying unit 18 is returned to the vertical screen state (step S21); the focused pictogram is determined (step S22); and the pictogram becomes a portion of the determined document (FIG. 18A).

Although the decomail picture or the pictogram is selectively added by selectively performing the right rotation or the left rotation in the above description, the pictogram may be input after inserting the decomail picture, or a process of inserting the decomail picture may be performed after inputting the pictogram. By performing such a process, the determined document can be created with the pictogram 228 and the decomail picture 186 added as shown in FIG. 19.

With regard to the above first embodiment, features will be extracted to refer to operational effects.

The portable terminal apparatus 2 includes a configuration allowing a screen portion, i.e., the displaying unit 18 to be rotated, includes the folding function, and includes a configuration allowing the movable housing 6 equipped with the displaying unit 18 to be rotated from the normal vertical screen state by 90 degrees to the left or right.

The rotation and opening/closing of the movable housing 6 equipped with the displaying unit 18 are detected by the sensor unit 96, and a function is included to detect whether the displaying unit 18 is rotated to the right or left.

Since the portable terminal apparatus 2 includes a configuration that is rotated from the normal vertical screen state by 90 degrees to the left or right to generate a horizontal screen, when the vertical screen 124 in the opened state is rotated 90-degree to the left or right, not only the character display is rotated 90-degree, but also the processes such as selecting the decomail picture and selecting the pictogram can be performed as the function assigned to the rotation or the rotation direction by simply rotating the displaying unit 18, and the selected decomail picture and pictogram can be determined by returning to the original screen to insert the decomail picture and pictogram into a portion of the determined document.

That is, when the movable housing 6 is rotated to the right, the horizontal screen 172 (FIG. 15) displays a list of the decomail pictures 186 and, when the movable housing 6 is returned to the center position a after selecting the decomail picture 186, the selected decomail picture 186 is determined and the window of the decomail picture group 188 is closed. When the movable housing 6 is rotated to the left, the horizontal screen 214 (FIG. 17) displays a list of the pictograms 228 and, when the movable housing 6 is returned to the center position a after selecting the pictogram 228, the selected pictogram 228 is determined and the window of the pictogram group 230 is closed.

Since the rotation operation of the displaying unit 18 can launch the functions such as displaying and selecting the decomail pictures 186 and the pictograms 228 and can determine the selected item, functionality and operationality can be improved.

Second Embodiment

Figure 21:
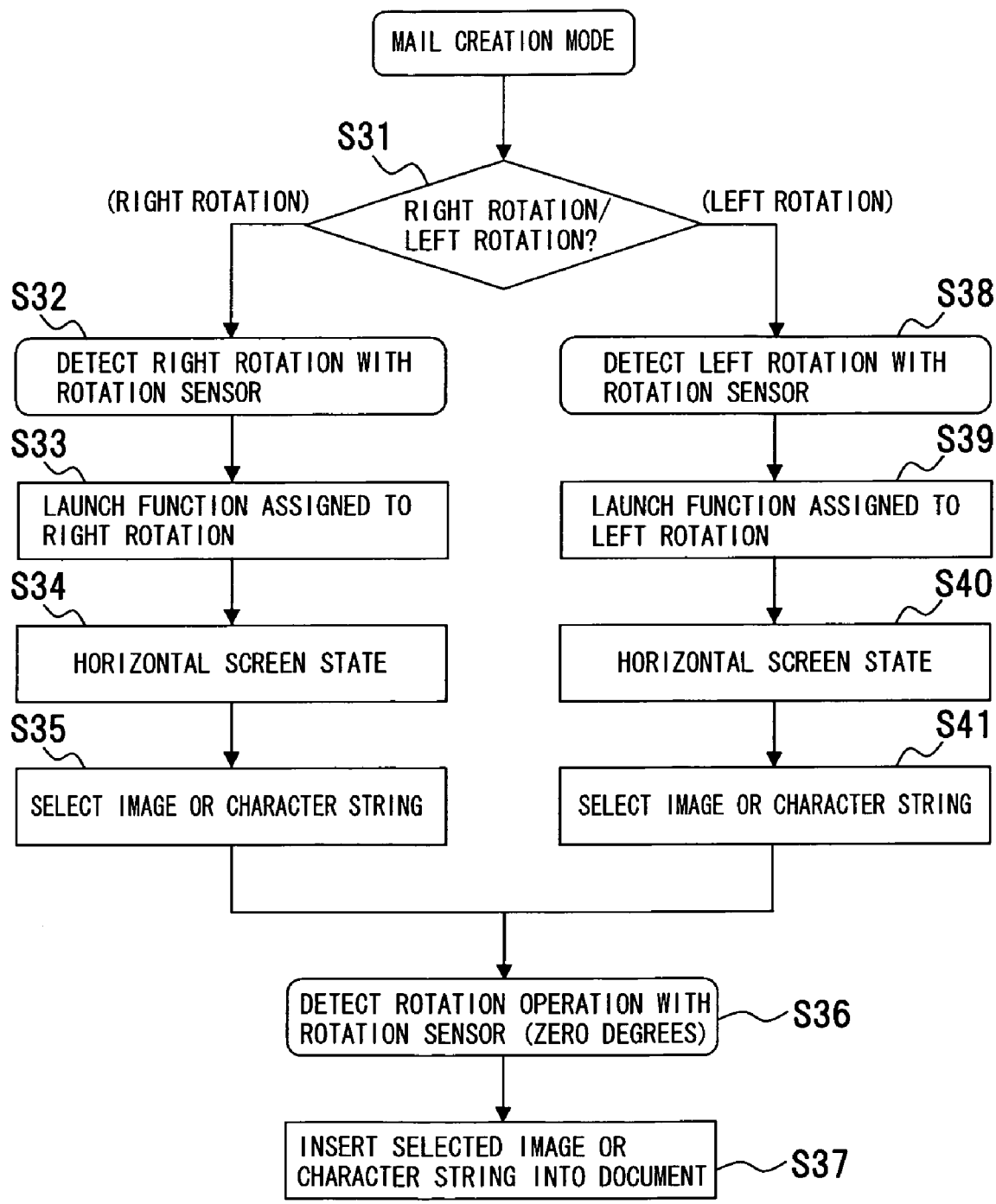
FIG. 21 is a flowchart of a control method and process procedures of a control program according to a second embodiment.
Figure 22:
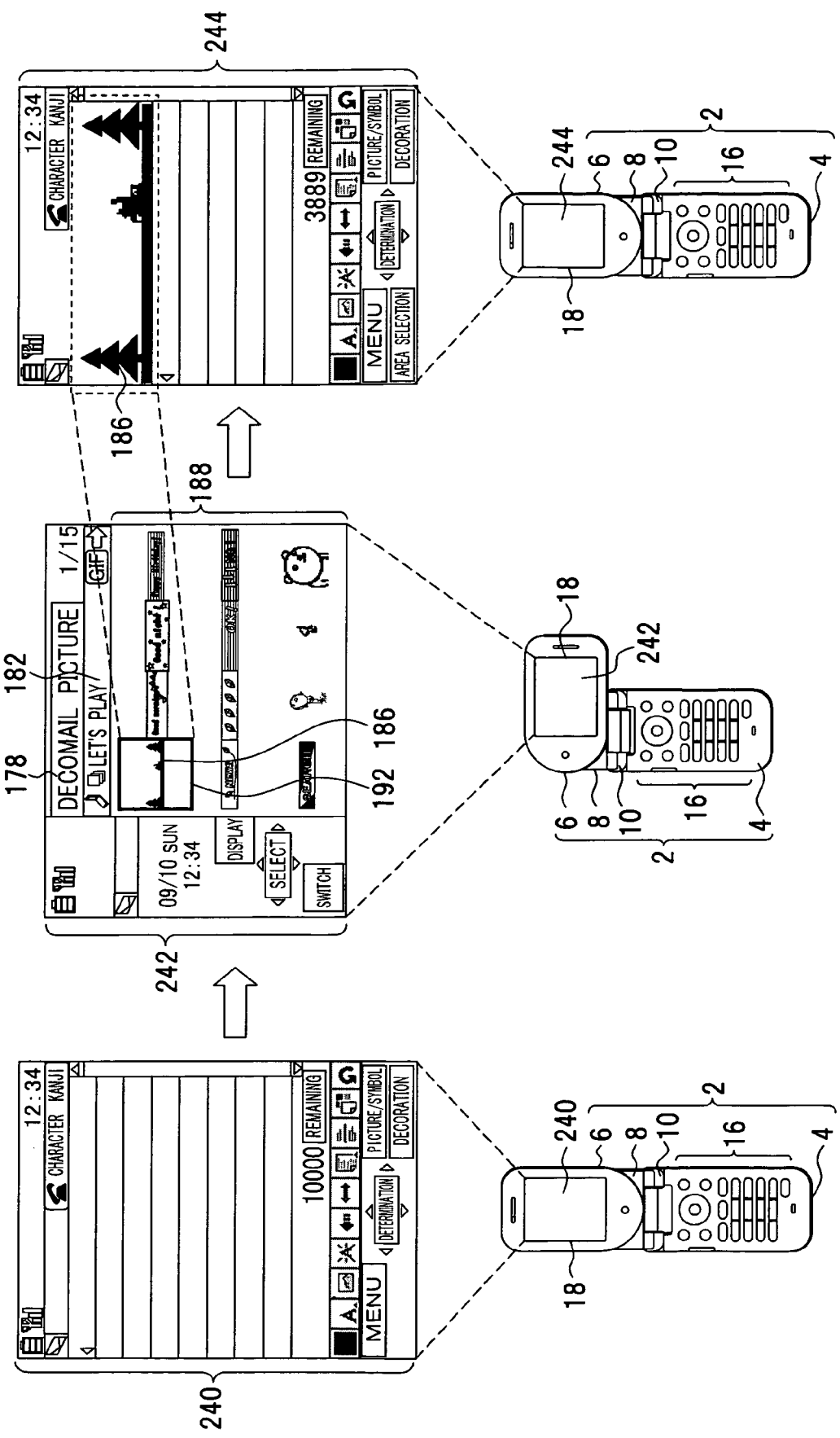
FIGS. 22A to 22C depict switching of screens.

A second embodiment of the present invention will be described with reference to FIGS. 21 and 22A to 22C. FIG. 21 is a flowchart of a control method and process procedures of a control program according to the second embodiment and FIGS. 22A to 22C depict switching of screens.

In this embodiment, the configuration shown in FIGS. 1 to 4 and 6 to 12 is also used and the same control method (FIG. 5) is applied. This embodiment shows process procedures including the function start-up using the rotation detection information of the rotation sensors 42, 44 and processes of selecting and inserting an image or a character string as the decomail picture into a document.

The mail creation mode is started, and a vertical screen 240 is displayed as shown in FIG. 22A to input the e-mail text. In this case, the rotation of the movable housing 6 is monitored to determine whether the movable housing 6 is rotated to the right or left (step S31). If the rotation sensors 42, 44 detect the right rotation (step S32) and the detection information is loaded to the CPU 90, the right rotation of the displaying unit 18 is determined. A function assigned to the right rotation is launched (step S33) and the displaying unit 18 becomes the horizontal screen state (step S34) to display the horizontal screen 242 as shown in FIG. 22B. The horizontal screen 242 displays "Decomail Picture" in the title field 178 and "Let's Play", which is the theme therefore, in the title bar 182 and displays the decomail picture group 188. The decomail pictures 186 include images and character strings. That is, the display of the decomail picture group 188 is a function assigned to the right rotation and the decomail pictures 186 are selectable items.

An image or a character string is selected from the decomail picture group 188 displayed on the horizontal screen 242 by operating the cursor key (step S35). The frame 192 of the horizontal screen 242 indicates a selected object.

When the movable housing 6 is rotated from the state of the horizontal screen 242 to the left and is returned to the original position, the rotation sensors 42, 44 detect the rotating operation and zero degrees of the center position a (step S36). The detection information is loaded to the CPU 90 and the selected image or character string is determined, loaded, and inserted into the document (step S37). As shown in FIG. 22C, the decomail picture 186 is inserted into the document of the vertical screen 244.

If the rotation sensors 42, 44 detect the left rotation (step S38) and the detection information is loaded to the CPU 90, the left rotation of the displaying unit 18 is determined. A function assigned to the left rotation is launched (step S39) and the displaying unit 18 becomes the horizontal screen state to display the horizontal screen (step S40). The horizontal screen displays images and character strings and the images and character strings configure selectable items.

An image or a character string is selected from the horizontal screen 242 by operating the cursor key (step S41) and, when the movable housing 6 is rotated to the original position, i.e., the center position a, the rotation sensors 42, 44 detect the rotating operation and zero degrees of the center position a (step S36). The detection information is loaded to the CPU 90 and, as is the case with the right rotation, the selected image or character string is determined, loaded, and inserted into the document on the vertical screen (step S37).

Third Embodiment

Figure 23:
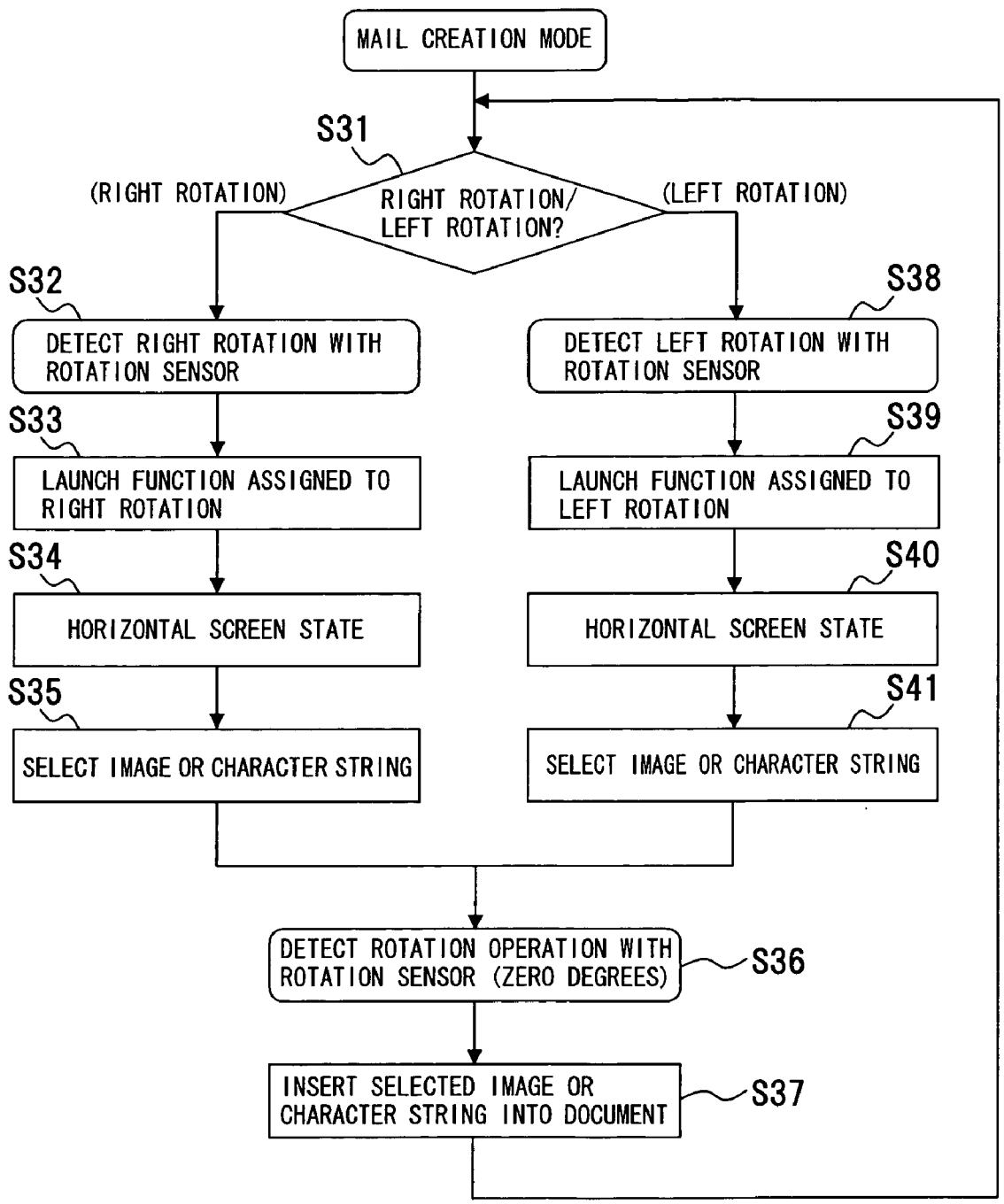
FIG. 23 is a flowchart of a control method and process procedures of a control program according to a third embodiment.
Figure 24:
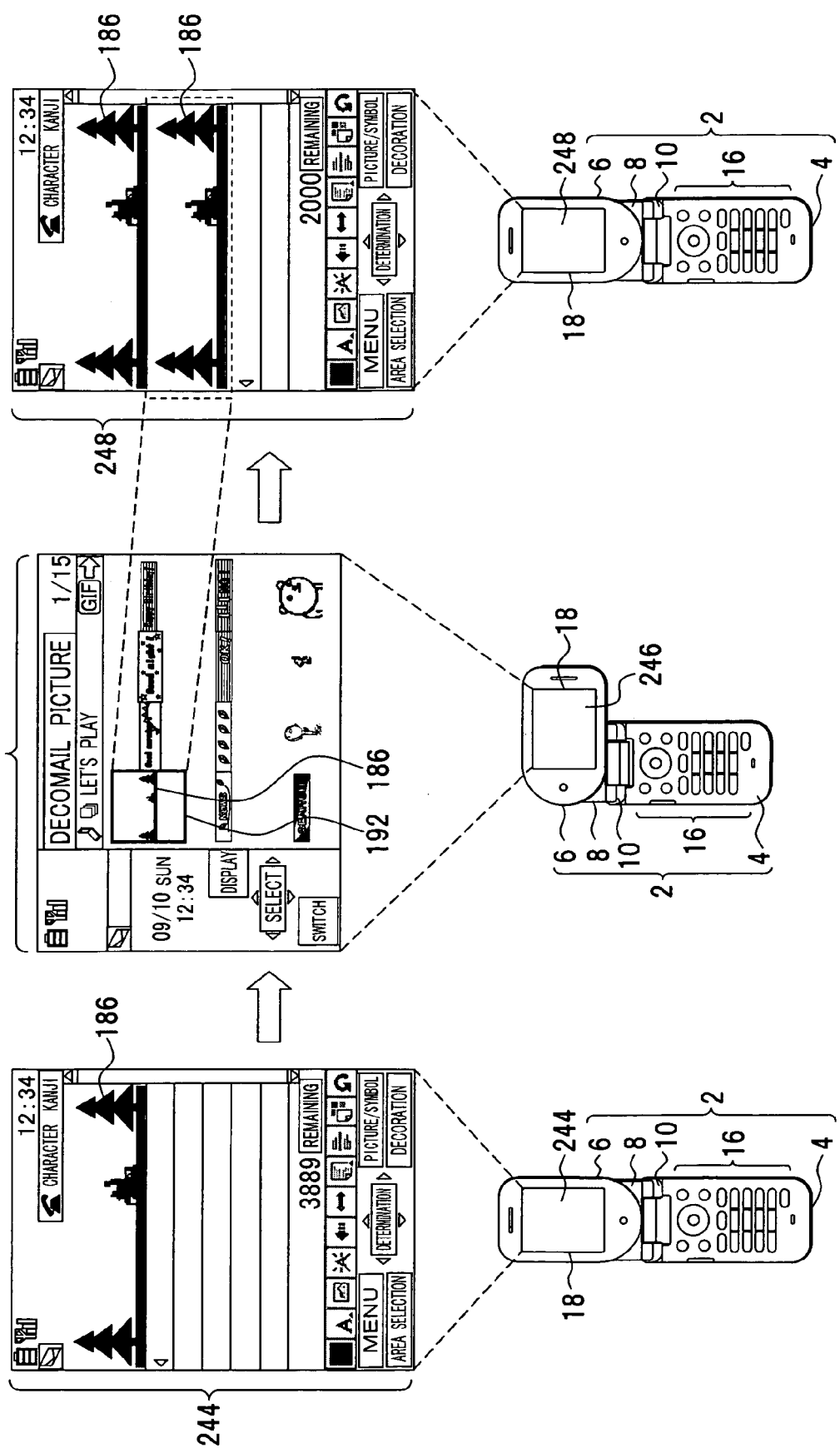
FIGS. 24A to 24C depict switching of screens.

A third embodiment of the present invention will be described with reference to FIGS. 23 and 24A to 24C. FIG. 23 is a flowchart of a control method and process procedures of a control program according to the third embodiment and FIGS. 24A to 24C depict switching of screens. In FIG. 23, the same reference numerals are added to the same portions as FIG. 21.

In this embodiment, the configuration shown in FIGS. 1 to 4 and 6 to 12 is also used and the same control method (FIG. 5) is applied. This embodiment enables consecutive process procedures for the function start-up using the rotation detection information of the rotation sensors 42, 44 and insertion of images or character strings as the decomail pictures. The flowchart shown in FIG. 23 is different from the flowchart shown in FIG. 21 in that the procedures are returned to step S31 after the process of step S37 to enable the consecutive processes.

In this embodiment, as a result of performing the process procedures of steps S31 to S37, the decomail picture 186 inserted in the document is displayed on the vertical screen 244 as shown in FIG. 24A. Such a process is performed as described in FIGS. 22A to 22C.

After the process of step S37 is completed, if the movable housing 6 is rotated again to the right, the rotation sensors 42, 44 detect the right rotation (step S32) and, when the detection information is loaded to the CPU 90, the right rotation of the displaying unit 18 is determined. The function assigned to the right rotation is launched (step S33) and the displaying unit 18 becomes the horizontal screen state (step S34) to display the horizontal screen 246 as shown in FIG. 24B. The horizontal screen 246 performs the same display as the horizontal screen 242 (FIG. 22B).

An image or a character string is selected from the decomail picture group 188 displayed on the horizontal screen 246 by operating the cursor key (step S35). When the movable housing 6 is rotated from the state of the horizontal screen 246 to the left and is returned to the original position, the rotation sensors 42, 44 detect the rotating operation and zero degrees of the center position a (step S36). The detection information is loaded to the CPU 90 and the selected image or character string is determined, loaded, and inserted into the document (step S37). As shown in FIG. 24C, the new decomail picture 186 is inserted into the document of the vertical screen 248, and the two decomail pictures 186 are inserted in this case.

The process goes back to step S31, and the function assigned to the right or left rotation can be launched based on the right or left rotation by the detection information thereof to insert the decomail picture 186, etc.

Fourth Embodiment

Figure 25:
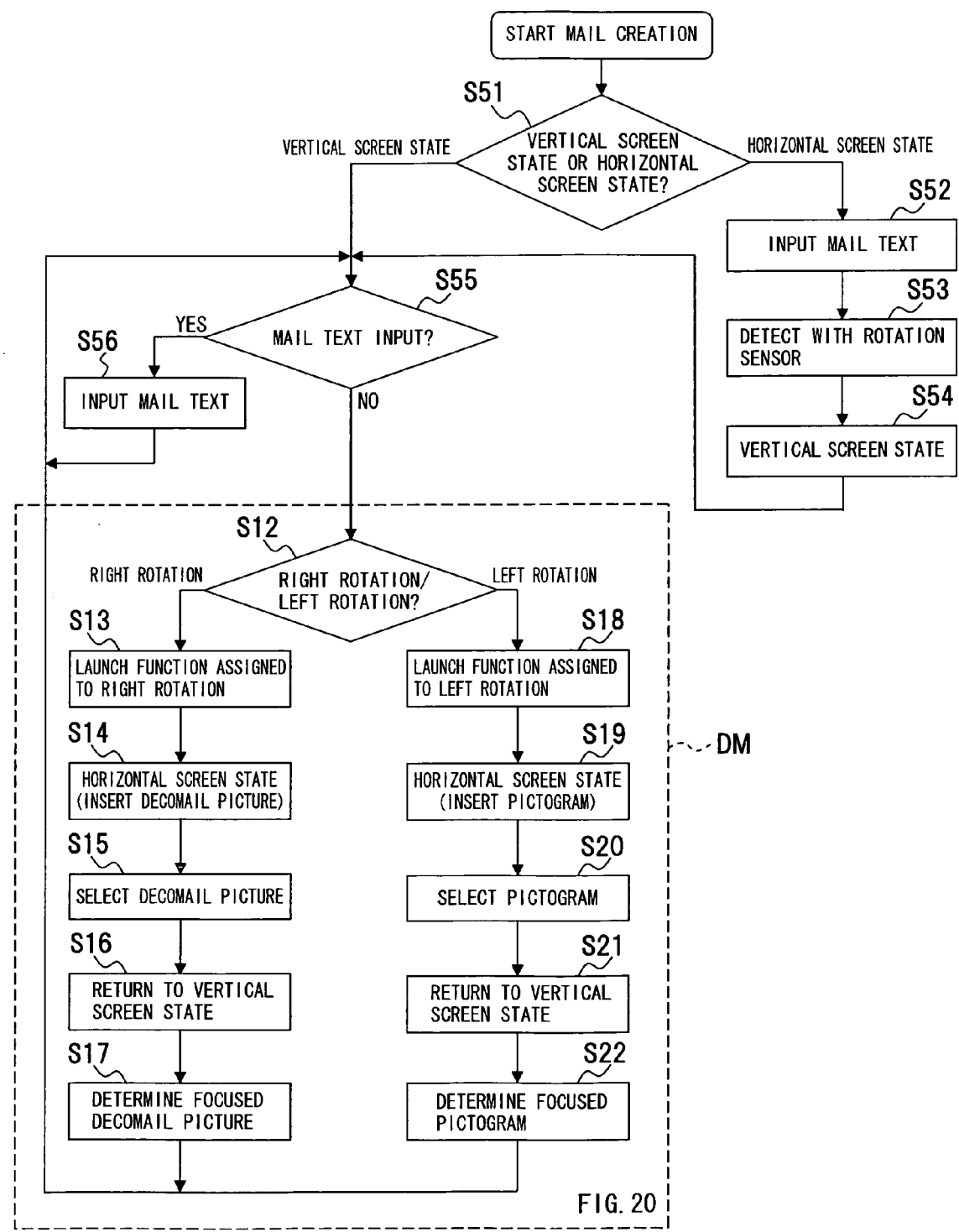
FIG. 25 is a flowchart of a control method and process procedures of a control program according to a fourth embodiment.

A fourth embodiment of the present invention will be described with reference to FIGS. 25 to 27B. FIG. 25 is a flowchart of a control method and process procedures of a control program according to a fourth embodiment and FIGS. 26A, 26B, 27A, and 27B depict switching of screens.

This embodiment is the case that a decomail picture, pictogram, etc., are inserted after starting the e-mail creating process on the horizontal screen and displaying the created document on the vertical screen and can facilitate the e-mail document creation with the horizontal screen, which spreads in the horizontal direction.

Figure 26A:
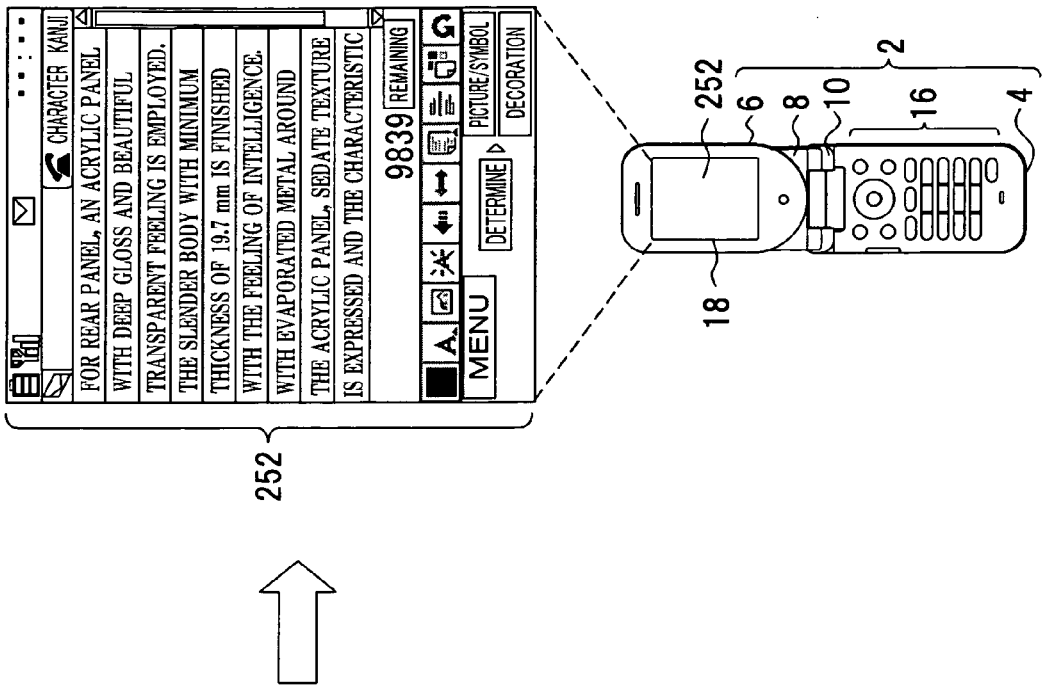
FIGS. 26A and 26B depict switching of screens.

In this embodiment, as shown in FIG. 25, when the mail creation mode is started, the vertical screen state or the horizontal screen state is determined by loading the detection information from the rotation sensors 42, 44 (step S51) and an e-mail text is entered on the horizontal screen (step S52). As shown in FIG. 26A, for example, if the movable housing 6 is rotated to the right, the displaying unit 18 displays a horizontal screen 250, and an e-mail text is entered on the horizontal screen 250. The spread in the horizontal direction can be utilized to create a document because of the horizontal screen 250, which spreads in the horizontal direction.

Figure 26B:
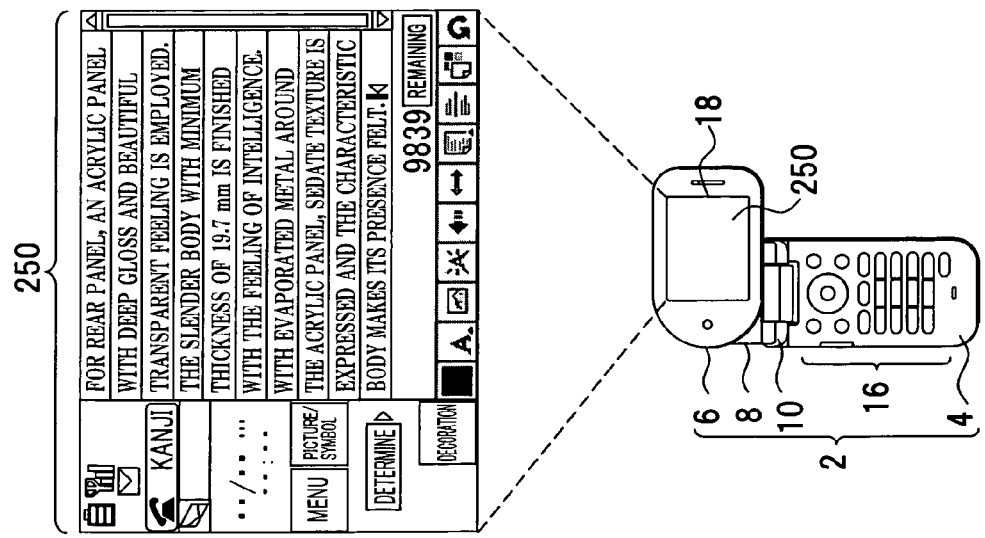

During the creation of the e-mail text, if the movable housing 6 is rotated to the left, the rotation sensors 42, 44 detect the rotation and the shift to the center position a (step S53), and the movable housing 6 is shifted to the vertical screen state in this case (step S54). Due to the shift to the vertical screen, the displaying unit 18 displays a vertical screen 252 as shown in FIG. 26B, and the document created on the horizontal screen 250 is displayed on the vertical screen 252 with the number of characters converted in accordance with the lines of the vertical screen 252. Since e-mail texts are normally entered on the vertical screen, it is determined whether the e-mail text is entered again (step S55); if the e-mail text is entered, the e-mail text can be entered (step S56); and if the e-mail text is not entered, the decomail picture 186 or the pictogram 228 can be inserted.

In the insertion mode DM for the decomail, etc., as shown in FIG. 25, the process of steps S12 to S17 and S18 to S22 is performed and, since this is the same as the process of the first embodiment (FIG. 20), that is, different functions are assigned to the right rotation and the left rotation and the selected item is determined by shifting to the vertical screen state, the same reference numerals are added as FIG. 20 and the description thereof is omitted. The process procedures shown in FIG. 21 or the process procedures shown in FIG. 23 may be used in the insertion mode DM.

Figure 27A:
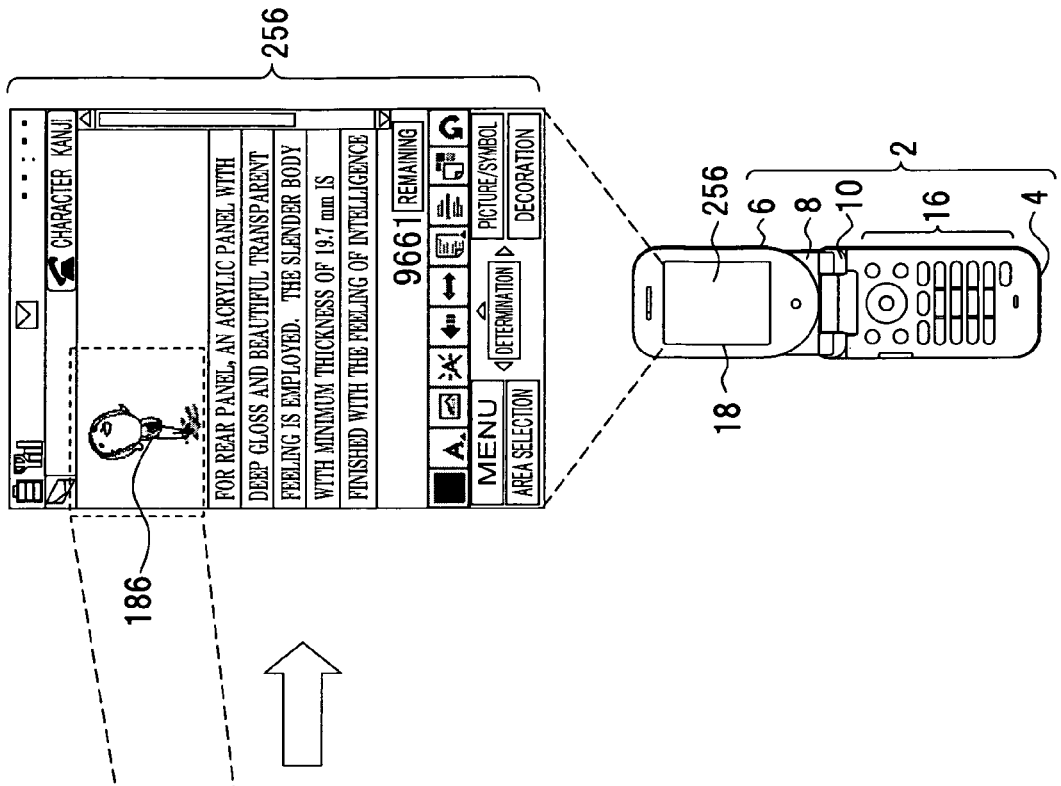
FIGS. 27A and 27B depict switching of screens.
Figure 27B:
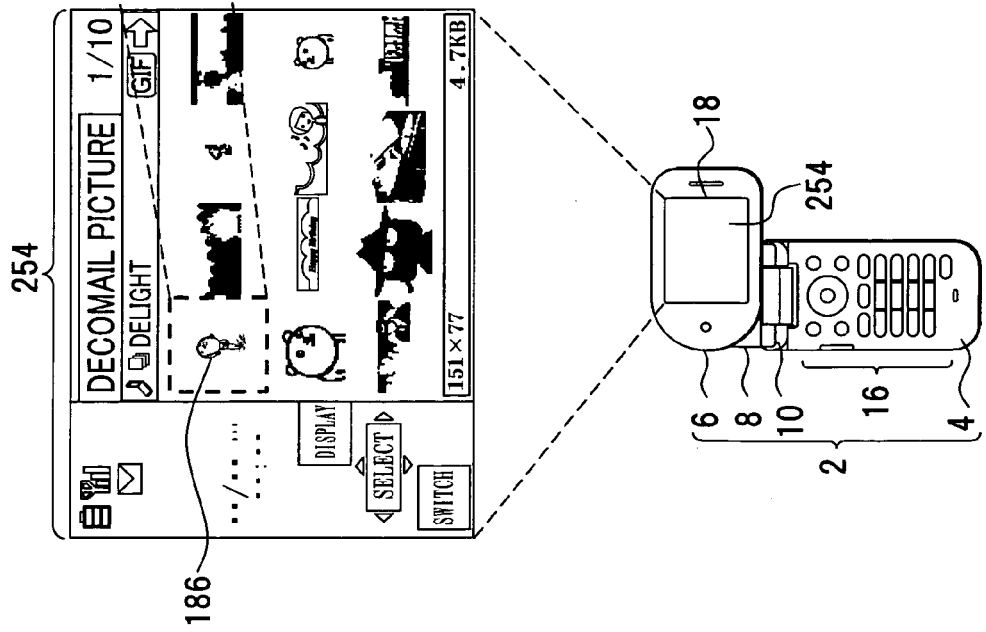

In this embodiment, for example, if the movable housing 6 is rotated to the right, the movable housing 6 becomes the horizontal screen state and the displaying unit 18 displays a horizontal screen 254 as shown in FIG. 27A. When the decomail picture 186 is selected from the horizontal screen 254 and the movable housing 6 is rotated to the left and returned from the horizontal screen state to the vertical screen state, the selected decomail picture 186 is determined and the document with the decomail picture 186 inserted is displayed on the vertical screen 256.

Figure 28:
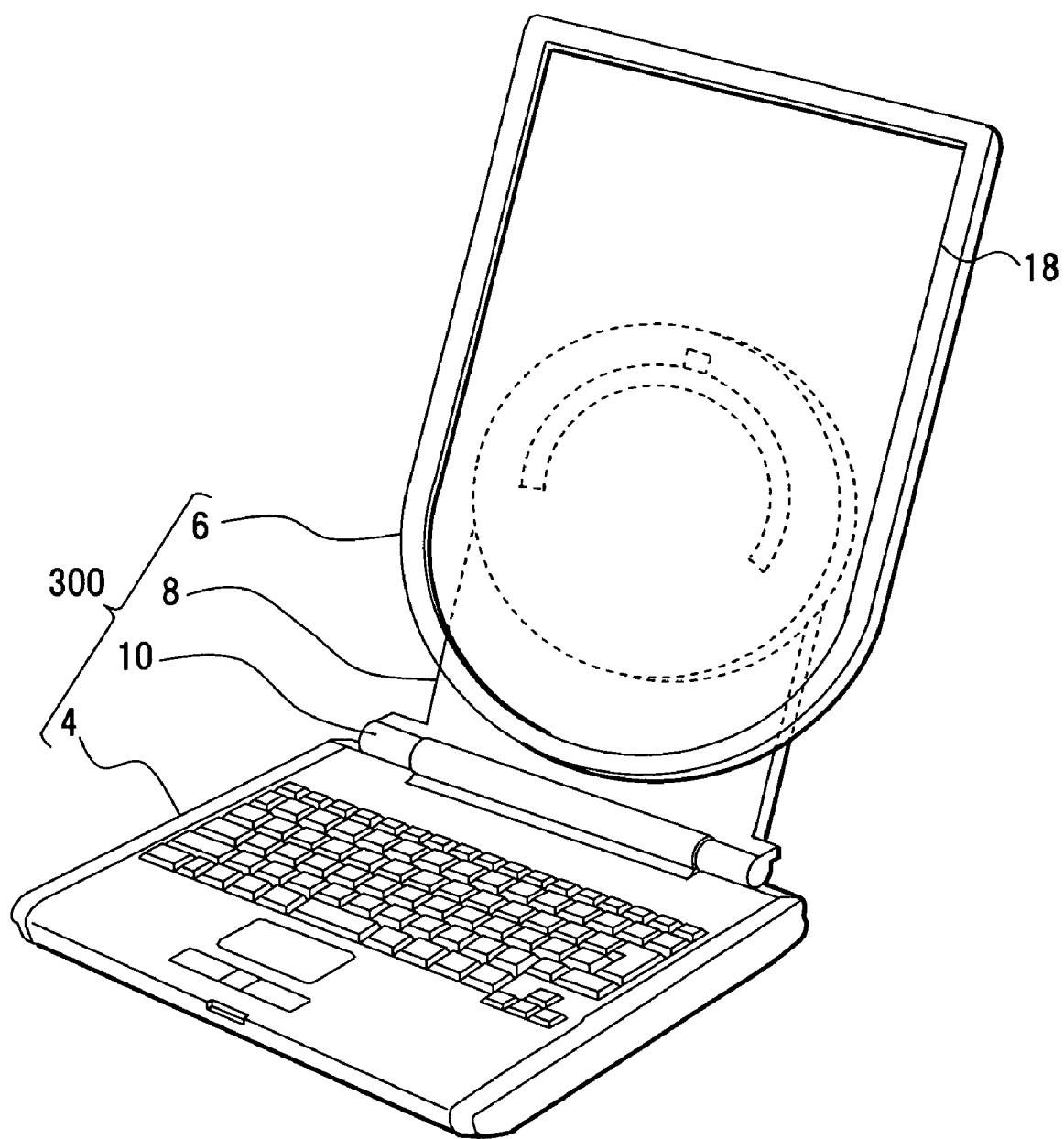
FIG. 28 depicts a PC (vertical screen display) according to another embodiment.
Figure 29:
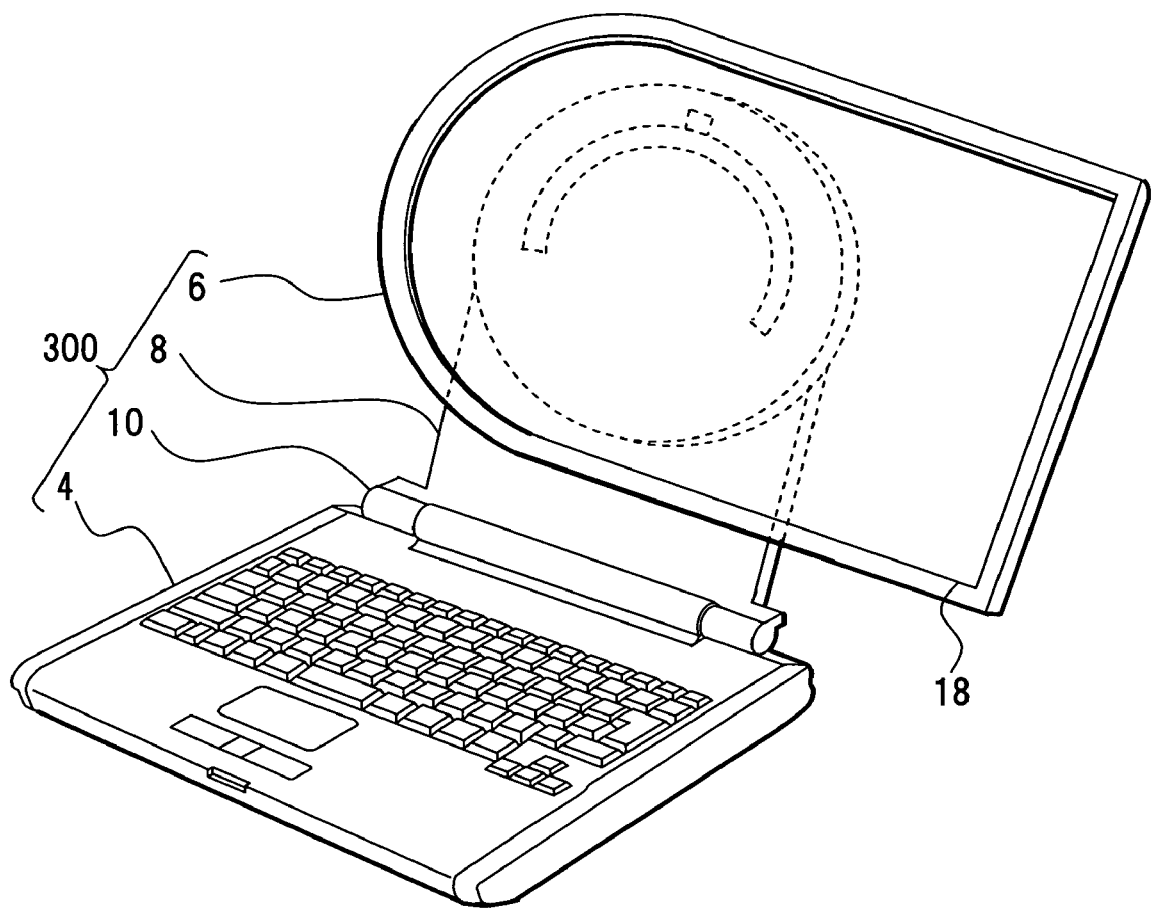
FIG. 29 depicts the PC (horizontal screen display) according to another embodiment.

Other Embodiments (1) Although the portable terminal apparatus 2 has been illustrated as the electronic device in the above embodiments, the present invention is applicable to a personal computer (PC). FIGS. 28 and 29 are perspective views of a PC; FIG. 28 depicts the case of maintaining the movable housing 6 vertically elongated in the opened state; and FIG. 29 depicts the case of rotating the movable housing 6 to the right and maintaining the movable housing 6 horizontally elongated in the opened state. In FIGS. 28 and 29, the same reference numerals are added to the same portions as FIGS. 1 to 27.

This PC 300 also includes the above mechanism (FIGS. 1 to 4 and 6 to 12) and electric circuit (FIG. 13) and executes the above control method (FIG. 5) and control program (FIGS. 20, 21 etc.); a function assigned to the right rotation or function assigned to the left rotation can be called and launched by rotating the movable housing 6 to the right or left and changing the vertical screen to the horizontal screen during the creation of an e-mail; and the item selected during the function can be determined by rotating and returning the movable housing 6 to the original screen to perform a process such as inserting the item into a document.

(2) Although the horizontal screen is displayed by rotating the movable housing 6 to the right or left and a pictogram or decomail picture is determined by returning the movable housing 6 in the input method of pictograms, decomail pictures, etc., of the above embodiments, the following input methods can be selected in the portable terminal apparatus 2 of the above embodiments. In one method, a pictogram list is called by pressing down a software key specifying the "picture/symbol", and a pictogram is selected and then determined. In another method, a sub-menu is called by a software key specifying the "menu" and a pictogram is selected by reaching the pictogram from the menu screen through pictograms/symbols/emoticons. In either method, the pictogram list is displayed through the menu. In these cases, the screen of the called pictogram list has a different layout and the pictogram can be selected by a decision key. In the former case, even when the pictogram is determined from the pictogram list by pressing down the decision key, the window of the pictogram list is not closed and the pictograms can be consecutively input. In the latter case, when the pictogram is determined from the pictogram list by pressing down the decision key, the window of the pictogram list is closed and returned to the normal character input screen. On the other hand, in the above embodiments, the pictogram list is called by rotating the movable housing 6 to the left, for example; the pictogram is determined and the window of the pictogram list is closed when the movable housing 6 is returned from the left rotated position to the center position; and therefore, the pictogram and the decomail picture can quickly and advantageously be displayed, selected, and determined.

(3) Although the portable terminal apparatus 2 and the PC 300 have been illustrated as the electronic device in the above embodiments, the present invention is applicable to game devices, etc., including a movable housing, a mail creation function, etc.

Although the most preferred embodiments, etc., of the present invention have been described as above, the present invention is not limited to the above description; it is obvious that various modifications and changes can be made by those skilled in the art based on the gist of the present invention described in the claims or disclosed in the specification; and it is needless to say that such modifications and changes are within the range of the present invention.

The present invention relates to an electronic device such as a portable terminal apparatus including a display function in a rotatable and/or openable/closable housing, and is useful in that functionality and operationality of the electronic device can be improved because if the screen aspect is changed from the vertical screen to the horizontal screen, from the horizontal screen to the vertical screen, etc. in accordance with rotation of the housing, a different function can be assigned to and launched by rotation to the right or left and an item selected during the function can be determined by rotation to the original screen.

What is claimed is:

1. An electronic device having a display function in a rotatable housing, comprising:
   a displaying unit that displays a first screen or a second screen in accordance with rotation; and
   a controlling unit that executes a first switching process if the controlling unit detects a rotation of the displaying unit accompanied by switching a screen from the first screen to the second screen in a mail creation mode displayed on the first screen, and executes a second switching process if the controlling unit detects a rotation of the displaying unit accompanied by switching a screen from the second screen to the first screen after executing the first switching process, the first switching process causing the controlling unit to launch a function displaying onto the second screen a plurality of selectable pictograms or decoration pictures which are candidates to be inserted into a document of mail created in the mail creation mode displayed on the first screen, the second switching process causing the controlling unit to determine a selected pictogram or decoration picture from the second screen and then causing the controlling unit to insert the selected pictogram or decoration picture into the document of mail created in the mail creation mode and then causing the controlling unit to display the mail with the inserted pictogram or decoration picture on the first screen,
   wherein the inserted pictogram or decoration picture configures a portion of the document of mail to provide visual pictogram or decoration picture among text message of the mail.

2. The electronic device of claim 1, wherein
   the controlling unit displays character strings on the first screen and/or the second screen of the displaying unit, and displays the selectable pictograms or decoration pictures on the second screen by rotating the displaying unit.

3. The electronic device of claim 1, wherein
   if the first screen is a vertically elongated vertical screen, the second screen is a horizontally elongated horizontal screen and, if the second screen is the vertical screen, the first screen is the horizontal screen.

4. The electronic device of claim 2, wherein
if the first screen is a vertically elongated vertical screen, the second screen is a horizontally elongated horizontal screen and, if the second screen is the vertical screen, the first screen is the horizontal screen.

5. The electronic device of claim 1, wherein
the displaying unit is disposed on a movable housing and this movable housing is rotatably supported by a movable arm that is attached to a fixed housing with a hinge in an openable/closable manner.

6. The electronic device of claim 1, wherein
the rotation is one or both of right rotation and left rotation.

7. The electronic device of claim 2, wherein
the rotation is one or both of right rotation and left rotation.

8. The electronic device of claim 1, comprising:
a rotation sensor that detects the presence of the rotation of the displaying unit and a rotation direction thereof.

9. The electronic device of claim 1, wherein
the second screen is in state of being rotated by 90 degrees from state of the first screen.

10. A control method of an electronic device having a display function in a rotatable housing, the method comprising:
displaying a first screen or a second screen on a displaying unit;
executing a first switching process if a rotation of the displaying unit accompanied by switching a screen from the first screen to the second screen is detected in a mail creation mode displayed on the first screen, the first switching process including launching a function displaying onto the second screen a plurality of selectable pictograms or decoration pictures which are candidates to be inserted into a document of mail created in the mail creation mode displayed on the first screen; and
executing a second switching process if a rotation of the displaying unit accompanied by switching a screen from the second screen to the first screen is detected after executing the first switching process, the second switching process including determining a selected pictogram or decoration picture from the second screen and then to insert the selected pictogram or decoration picture into the document of mail created in the mail creation mode and then to display the mail with the inserted pictogram or decoration picture on the first screen,
wherein the inserted pictogram or decoration picture configures a portion of the document of mail to provide visual pictogram or decoration picture among text message of the mail.

11. The control method of an electronic device of claim 10, further comprising:
displaying the selectable pictograms or decoration pictures on the second screen by rotating the displaying unit.

12. The control method of an electronic device of claim 10, wherein
if the first screen is a vertically elongated vertical screen, the second screen is a horizontally elongated horizontal screen and, if the second screen is the vertical screen, the first screen is the horizontal screen.

13. The control method of an electronic device of claim 11, wherein
if the first screen is a vertically elongated vertical screen, the second screen is a horizontally elongated horizontal screen and, if the second screen is the vertical screen, the first screen is the horizontal screen.

14. The control method of an electronic device of claim 10, wherein
the rotation is one or both of right rotation and left rotation.

15. The control method of an electronic device of claim 11, wherein
the rotation is one or both of right rotation and left rotation.

16. The control method of an electronic device of claim 10, wherein
the second screen is in state of being rotated by 90 degrees from state of the first screen.

17. A recording medium storing a computer-readable control program of an electronic device including a display function in a rotatable housing, the program being executed by a computer, the program comprising:
displaying a first screen or a second screen on a displaying unit;
executing a first switching process if a rotation of the displaying unit accompanied by switching a screen from the first screen to the second screen is detected in a mail creation mode displayed on the first screen, the first switching process including launching a function displaying onto the second screen a plurality of selectable pictograms or decoration pictures which are candidates to be inserted into a document of mail created in the mail creation mode displayed on the first screen; and
executing a second switching process if a rotation of the displaying unit accompanied by switching a screen from the second screen to the first screen is detected after executing the first switching process, the second switching process including determining a selected pictogram or decoration picture from the second screen and then to insert the selected pictogram or decoration picture into the document of mail created in the mail creation mode and then to display the mail with the inserted pictogram or decoration picture on the first screen,
wherein the inserted pictogram or decoration picture configures a portion of the document of mail to provide visual pictogram or decoration picture among text message of the mail.

18. The recording medium storing a computer-readable control program of an electronic device of claim 17, further comprising:
displaying the selectable pictograms or decoration pictures on the second screen by rotating the displaying unit.

19. The recording medium storing a computer-readable control program of an electronic device of claim 17, wherein
if the first screen is a vertically elongated vertical screen, the second screen is a horizontally elongated horizontal screen and, if the second screen is the vertical screen, the first screen is the horizontal screen.

20. The recording medium storing a computer-readable control program of an electronic device of claim 18, wherein
if the first screen is a vertically elongated vertical screen, the second screen is a horizontally elongated horizontal screen and, if the second screen is the vertical screen, the first screen is the horizontal screen.

21. The recording medium storing a computer-readable control program of an electronic device of claim 17, wherein
the rotation is one or both of right rotation and left rotation.

22. The recording medium storing a computer-readable control program of an electronic device of claim 18, wherein
the rotation is one or both of right rotation and left rotation.

23. The recording medium storing a computer-readable control program of an electronic device of claim 17, wherein
the second screen is in state of being rotated by 90 degrees from state of the first screen.

* * * * *